(12) United States Patent
Matsumura et al.

(10) Patent No.: US 11,405,071 B2
(45) Date of Patent: Aug. 2, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 16/763,804

(22) PCT Filed: Nov. 16, 2017

(86) PCT No.: PCT/JP2017/041378
§ 371 (c)(1),
(2) Date: May 13, 2020

(87) PCT Pub. No.: WO2019/097659
PCT Pub. Date: May 23, 2019

(65) Prior Publication Data
US 2020/0389204 A1     Dec. 10, 2020

(51) Int. Cl.
*H04B 1/713* (2011.01)
*H04W 72/04* (2009.01)

(52) U.S. Cl.
CPC .......... *H04B 1/713* (2013.01); *H04W 72/042* (2013.01); *H04W 72/0413* (2013.01); *H04W 72/0453* (2013.01)

(58) Field of Classification Search
CPC . H04B 1/713; H04B 1/7143; H04W 72/0413; H04W 72/042; H04W 72/0453; H04L 5/0044; H04L 5/0012; H04L 5/0007
See application file for complete search history.

(56) References Cited

U.S. PATENT DOCUMENTS

| | | | | |
|---|---|---|---|---|
| 10,873,435 B2 * | 12/2020 | Huang | .................... | H04L 1/005 |
| 10,880,869 B2 * | 12/2020 | Hwang | ................. | H04L 5/0044 |
| 10,912,068 B2 * | 2/2021 | Yin | .................... | H04W 72/0406 |
| 10,999,032 B2 * | 5/2021 | Choi | ..................... | H04L 5/0048 |
| 11,196,519 B2 * | 12/2021 | Takeda | .................. | H04L 5/0053 |
| 11,212,046 B2 * | 12/2021 | Takeda | .................. | H04L 1/1861 |
| 11,245,498 B2 * | 2/2022 | Takeda | .................. | H04W 28/04 |

(Continued)

FOREIGN PATENT DOCUMENTS

| | | |
|---|---|---|
| CN | 104041160 A | 9/2014 |
| EP | 2437401 A1 | 4/2012 |

(Continued)

OTHER PUBLICATIONS

Extended European Search Report issued in counterpart European Patent Application No. 17932373.8, dated Jun. 11, 2021 (11 pages).

(Continued)

*Primary Examiner* — Brian T O Connor
(74) *Attorney, Agent, or Firm* — Osha Bergman Watanabe & Burton LLP

(57) ABSTRACT

Inter-slot frequency hopping of an uplink channel/signal is appropriately controlled. A user terminal according to the present invention includes: a transmission section that transmits an uplink data channel over a plurality of slots; and a control section that controls frequency hopping of the uplink data channel between the plurality of slots.

6 Claims, 20 Drawing Sheets

(56) References Cited

U.S. PATENT DOCUMENTS

| | | | |
|---|---|---|---|
| 2012/0057449 A1 | 3/2012 | Takaoka et al. | |
| 2015/0055618 A1 | 2/2015 | Takaoka et al. | |
| 2016/0323874 A1 | 11/2016 | Pajukoski et al. | |
| 2018/0295651 A1* | 10/2018 | Cao | H04W 74/0833 |
| 2018/0376473 A1* | 12/2018 | Wang | H04L 5/0055 |
| 2019/0109732 A1* | 4/2019 | Choi | H04L 1/00 |
| 2020/0120642 A1* | 4/2020 | Hwang | H04L 5/005 |
| 2020/0120680 A1* | 4/2020 | Hwang | H04L 5/0044 |
| 2020/0404654 A1* | 12/2020 | Wang | H04L 5/0026 |

FOREIGN PATENT DOCUMENTS

| | | |
|---|---|---|
| EP | 3462795 A1 | 4/2019 |
| JP | 2014-168279 A | 9/2014 |

OTHER PUBLICATIONS

NTT Docomo, Inc.; "Frequency-domain resource allocation"; 3GPP TSG RAN WG1 Meeting #90, R1-1713948; Prague, Czechia, Aug. 21-25, 2017 (6 pages).

NTT Docomo, Inc.; "Summary of open issues for AI 7.3.3.4"; 3GPP TSG RAN WG1 Meeting #90bis, R1-1718815, Oct. 9-13, 2017 (17 pages).

International Search Report issued in PCT/JP2017/041378 dated Jan. 16, 2018 (1 page).

Written Opinion of the International Searching Authority issued in PCT/JP2017/041378 dated Jan. 16, 2018 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in the counterpart Chinese Patent Application No. 201780098151.7, dated Jun. 25, 2021 (19 pages).

Notice of Reasons for Refusal issued in Japanese Application No. 2019-554137 dated Jan. 5, 2022 (8 pages).

Office Action issued in Chinese Application No. 201780098151.7; dated Feb. 23, 2022 (10 pages).

Office Action issued in Indian Application No. 202037024836; dated Mar. 16, 2022 (6 pages).

* cited by examiner

| PUCCH FORMAT | NUMBER OF SYMBOLS | NUMBER OF BITS |
|---|---|---|
| 0 | 1-2 | ≤2 |
| 1 | 4-14 | ≤2 |
| 2 | 1-2 | >2 |
| 3 | 4-14 | >N |
| 4 | 4-14 | >2, <N |

FIG. 2

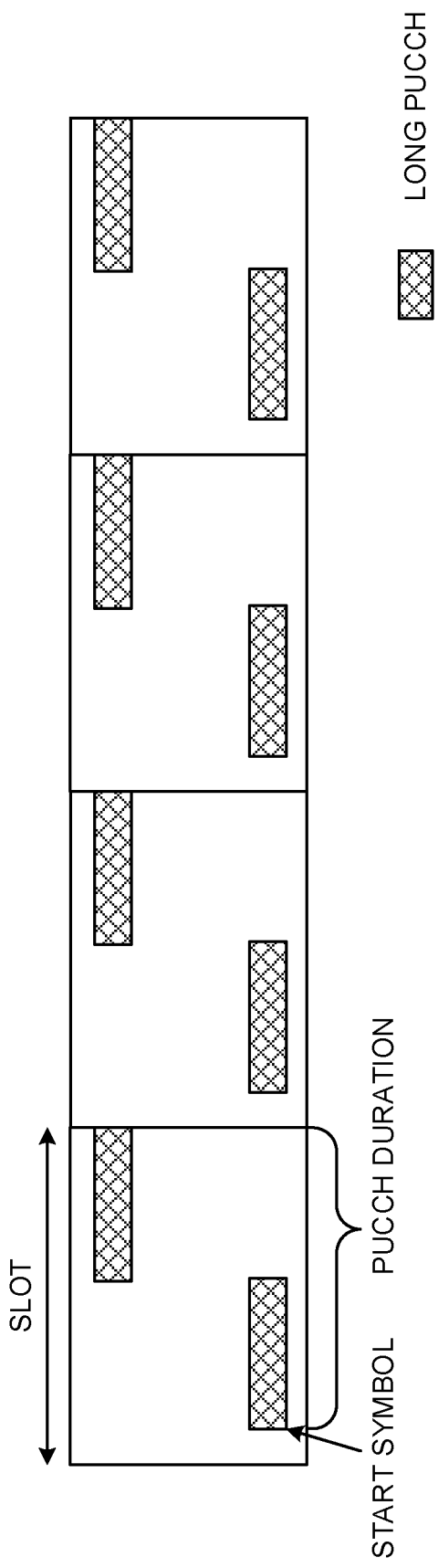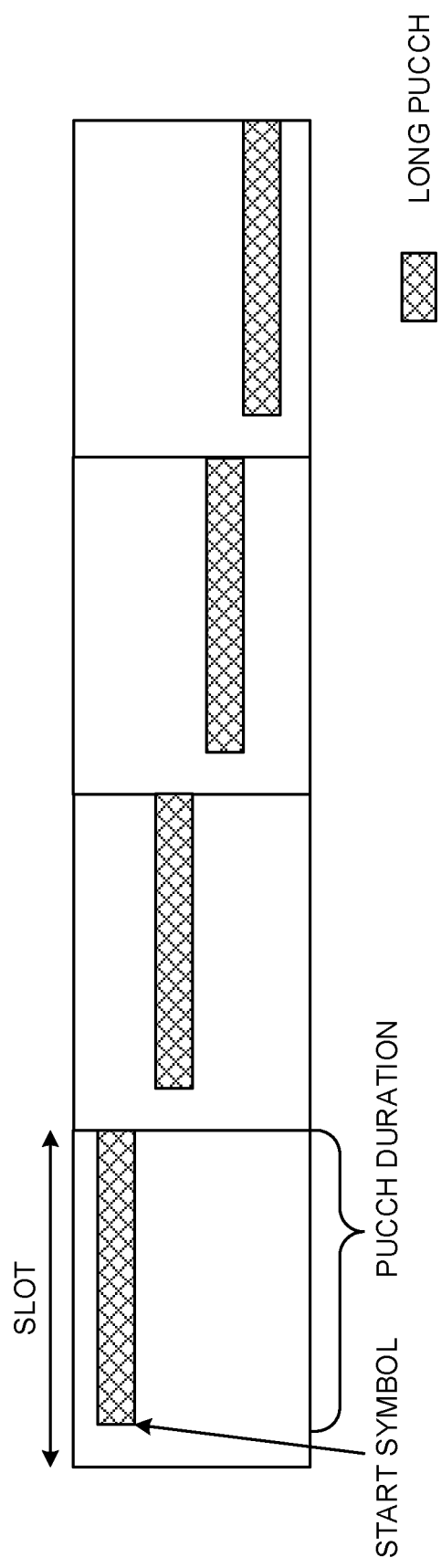

FIG. 5A
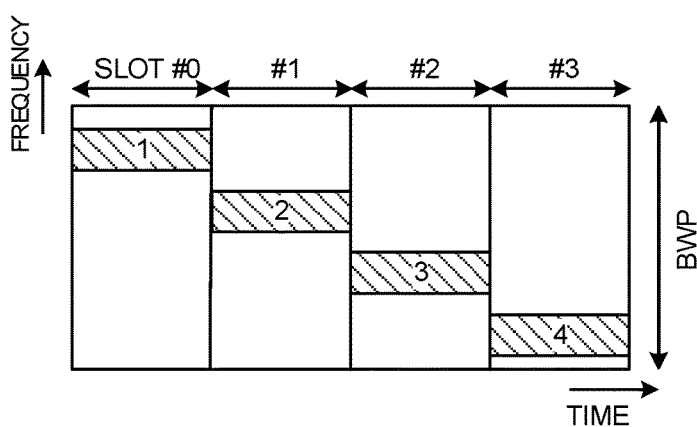
FIG. 5B
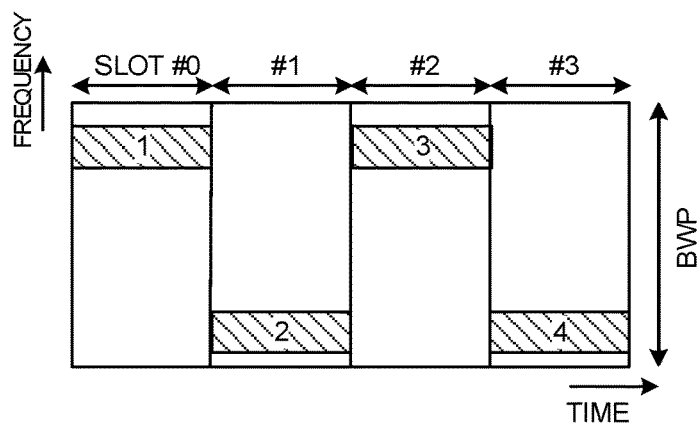
FIG. 5C
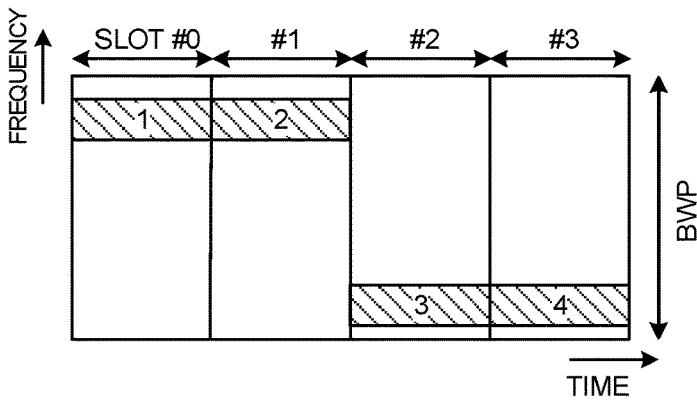
FIG. 5D
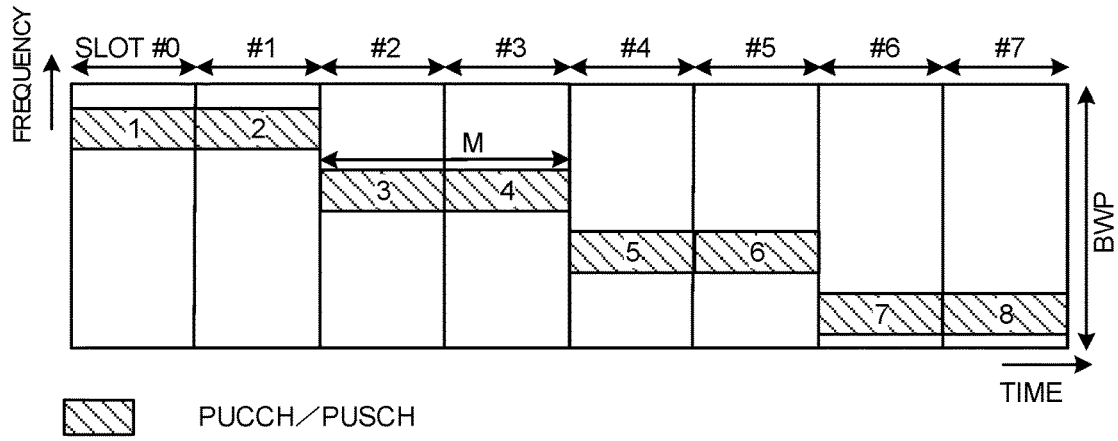
 PUCCH/PUSCH FIG. 7A
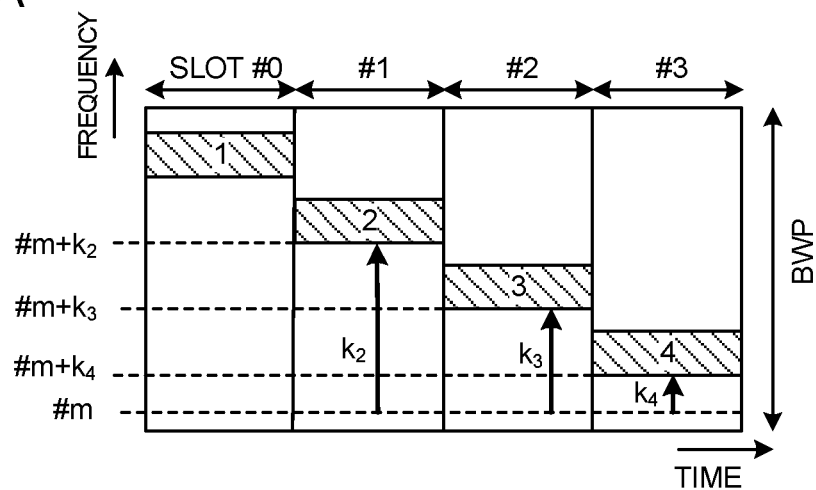
FIG. 7B
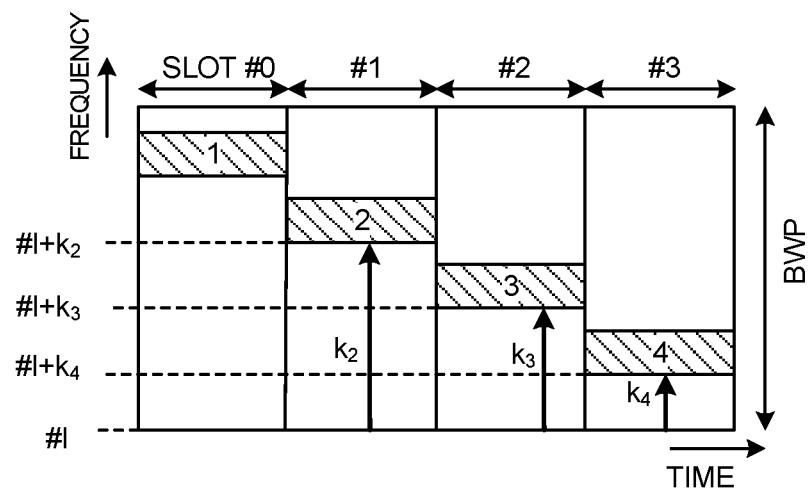
 PUCCH/PUSCH

FIG. 12A

| GIVEN FIELD VALUE IN DCI | PUCCH RESOURCE SET |
|---|---|
| 00 | PUCCH RESOURCE SET #0 |
| 01 | PUCCH RESOURCE SET #1 |
| 10 | PUCCH RESOURCE SET #2 |
| 11 | PUCCH RESOURCE SET #3 |

FIG. 12B

PARAMETER GROUP INCLUDED IN EACH PUCCH RESOURCE SET

| |
|---|
| START SYMBOL |
| NUMBER OF SYMBOLS IN SLOT |
| INDEX FOR IDENTIFYING FREQUENCY RESOURCE OF FIRST HOP |
| NUMBER OF PRBS |
| WHETHER FREQUENCY HOPPING IS ENABLED OR IS NOT ENABLED |
| INFORMATION RELATED TO FREQUENCY RESOURCES OF SECOND AND SUBSEQUENT HOPS |
| FREQUENCY HOPPING MODE FOR A PLURALITY OF SLOTS |

INFORMATION INCLUDED IN DCI

| START SYMBOL |
| --- |
| NUMBER OF SYMBOLS IN SLOT |
| ALLOCATION INFORMATION OF FREQUENCY RESOURCES TO PUSCH (c) |
| WHETHER FREQUENCY HOPPING IS ENABLED OR IS NOT ENABLED (a) |
| INFORMATION RELATED TO FREQUENCY RESOURCES OF SECOND AND SUBSEQUENT HOPS (b) |
| FREQUENCY HOPPING MODE FOR A PLURALITY OF SLOTS (d) |

RESOURCE ALLOCATION FIELD OF X BITS

| (a) | (b)+(c) |
|---|---| ceil [log (Y RBs* (Y RBs+1))] BITS      Z BITS

FIG. 14B

| Z=1 | (b)+(c) |
|---|---|
| 0 | 0 (NO HOPPING) |
| 1 | 1/2 * S |

FIG. 14C

| Z=2 | (b)+(c) |
|---|---|
| 00 | 0 (NO HOPPING) |
| 01 | 1/2 * S |
| 10 | (+1/4) * S |
| 11 | (−1/4) * S |

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE Advanced (LTE-A), Future Radio Access (FRA), 4G; 5G; 5G+(plus), New RAT (NR), and LTE Rel. 14 and 15~) have been also studied.

Legacy LTE systems (e.g., LTE Rel. 8 to 13) perform communication on Downlink (DL) and/or Uplink (UL) by using subframes (also referred to as, for example, Transmission Time Intervals (TTIs)) of 1 ms. The subframe is a transmission time unit of 1 channel-coded data packet, and is a processing unit of scheduling, link adaptation and retransmission control (HARQ: Hybrid Automatic Repeat reQuest).

Furthermore, in the legacy LTE systems (e.g., LTE Rel. 8 to 13), a user terminal transmits Uplink Control Information (UCI) by using an uplink control channel (e.g., PUCCH: Physical Uplink Control Channel) or an uplink data channel (e.g., PUSCH: Physical Uplink Shared Channel). A configuration (format) of the uplink control channel will be referred to as, for example, a PUCCH Format (PF).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for future radio communication systems (e.g., LTE Rel. 14 and 15~, 5G and NR) to introduce an uplink channel and/or an uplink signal (uplink channel/signal) (e.g., at least one of, for example, an uplink control channel (PUCCH), an uplink data channel (PUSCH) and a Sounding Reference Signal (SRS)) over a plurality of slots. Furthermore, it has been studied to apply frequency hopping (inter-slot frequency hopping) for hopping frequency resources on which the uplink channel/signal are mapped between a plurality of these slots.

In this regard, an access BW may be referred to as, for example, a carrier (a Component Carrier (CC) or a system band) or a partial frequency band (a partial band or a Bandwidth Part (BWP)) in the carrier.

Thus, it is preferred that the future radio communication system in which different access BWs can be configured to a plurality of user terminals appropriately controls an inter-slot frequency hopping pattern (e.g., a position and/or a hopping timing (hopping boundary) of each frequency resource to be hopped) of an uplink channel/signal.

The present invention has been made in light of this point, and one of objects of the present invention is to provide a user terminal and a radio communication method that can appropriately control inter-slot frequency hopping of an uplink channel/signal.

Solution to Problem

One aspect of a user terminal according to the present invention includes: a transmission section that transmits an uplink data channel over a plurality of slots; and a control section that controls frequency hopping of the uplink data channel between the plurality of slots.

Advantageous Effects of Invention

According to the present invention, it is possible to appropriately control inter-slot frequency hopping of an uplink channel/signal.

BRIEF DESCRIPTION OF DRAWINGS

FIG. 2 is a diagram illustrating one example of PUCCH formats of the future radio communication system.

FIGS. 4A and 4B are diagrams illustrating one example of a long PUCCH over a plurality of slots.

FIGS. 5A to 5D are diagrams illustrating one example of inter-slot frequency hopping according to a first aspect.

FIGS. 7A and 7B are diagrams illustrating a change example of the frequency offset in a case where the inter-slot frequency hopping is enabled according to the first aspect.

FIGS. 12A and 12B are diagrams illustrating one example of a PUCCH resource set according to a fourth aspect.

FIG. 13 is a diagram illustrating one example of DCI according to a fifth aspect.

FIGS. 14A to 14C are diagrams illustrating one example of a joint field in DCI according to the fifth aspect.

DESCRIPTION OF EMBODIMENTS

Legacy LTE systems (e.g., LTE Rel. 13 and prior releases) support uplink control channels (PUCCHs) of a plurality of formats (e.g., LTE PUCCH formats (LTE PFs) 1 to 5) of an identical duration (e.g., 14 symbols in a case of general Cyclic Prefix (CP)).

It has been studied for future radio communication systems (e.g., LTE Rel. 15~, 5G and NR) to transmit UCI by using uplink control channels (PUCCHs) of a plurality of formats (e.g., NR PUCCH formats (NR PFs) that will be referred to simply as PUCCH formats) whose durations are at least different.

Figure 1A:
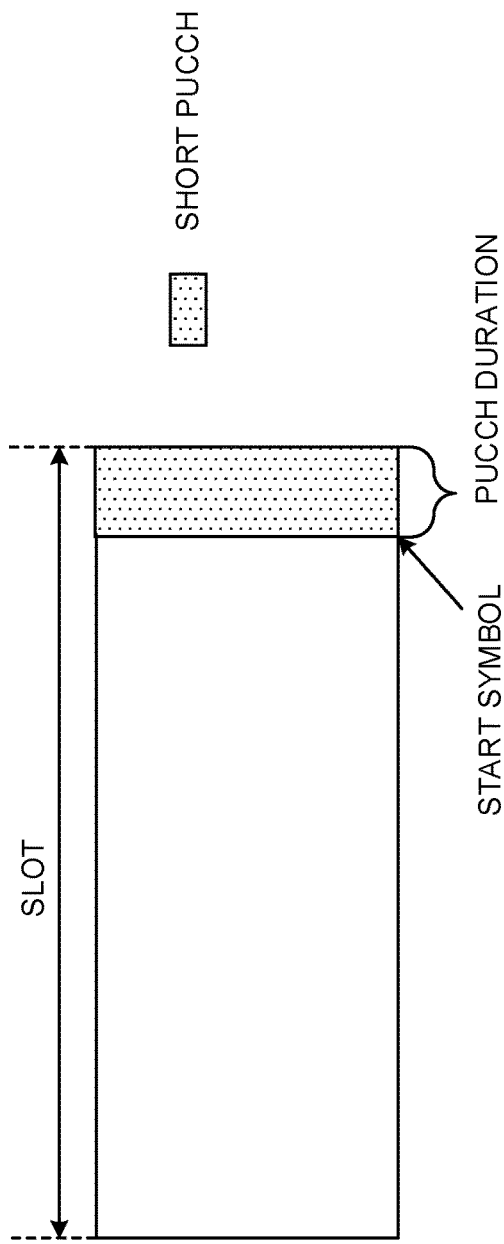
FIGS. 1A and 1B are diagrams illustrating one example of a PUCCH in a future radio communication system.
Figure 1B:
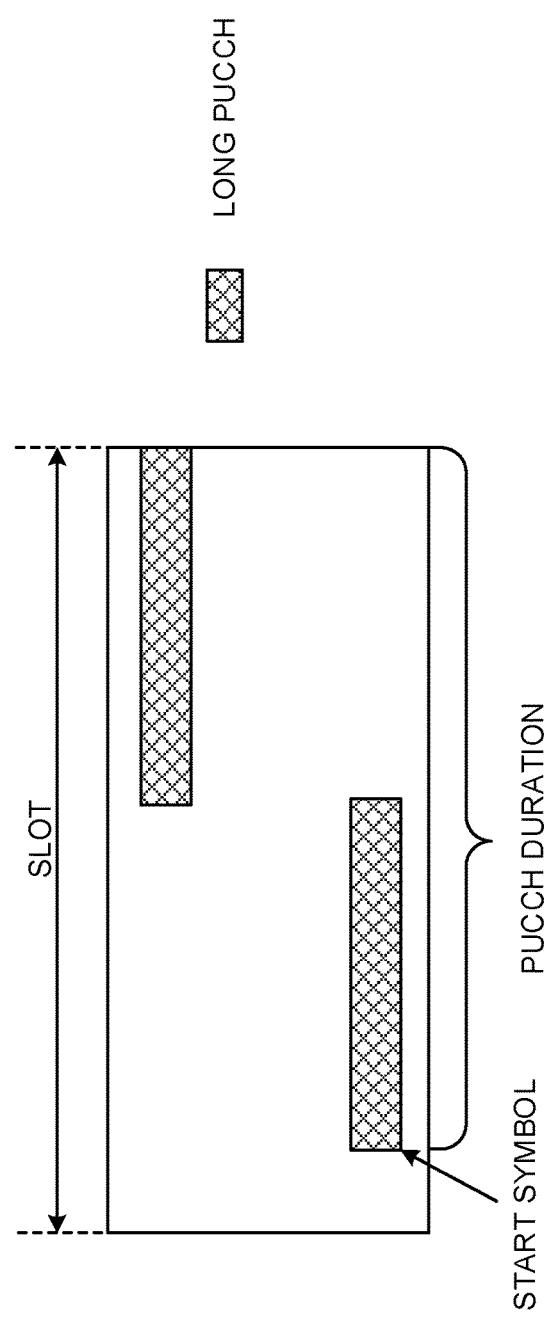

FIG. 1 is a diagram illustrating one example of a PUCCH of the future radio communication system. FIG. 1A illustrates a PUCCH (a short PUCCH or a first uplink control channel) including a relatively small number of symbols (a duration such as 1 to 2 symbols). FIG. 1B illustrates a PUCCH (a long PUCCH or a second uplink control channel) including a larger number of symbols (a duration such as 4 to 14 symbols) than that of the short PUCCH.

As illustrated in FIG. 1A, the short PUCCH may be arranged on a given number of symbols (e.g., 1 to 2 symbols) (PUCCH duration) from a last of a slot. In addition, the short PUCCH arrangement symbols are not limited to the last of the slot, and may be a given number of starting or intermediate symbols of the slot. A start position in a time direction of the short PUCCH in the slot may be indicated by a start symbol index.

Furthermore, the short PUCCH is arranged on one or more frequency resources (e.g., one or more PRBs). In addition, in FIG. 1A, the short PUCCH is arranged in contiguous PRBs, yet may be arranged in non-contiguous PRBs.

Furthermore, the short PUCCH may be subjected to time division multiplexing and/or frequency division multiplexing with an uplink data channel (also referred to as a PUSCH below) in a slot. Furthermore, the short PUCCH may be subjected to time division multiplexing and/or frequency division multiplexing with a downlink data channel (also referred to as a PDSCH below) and/or a downlink control channel (also referred to as a PDCCH: Physical Downlink Control Channel below) in the slot.

For the short PUCCH, a multicarrier waveform (e.g., Orthogonal Frequency Division Multiplexing (OFDM) waveform) may be used, or a single carrier waveform (e.g., a Discrete Fourier Transform-Spread-Orthogonal Frequency Division Multiplexing (DFT-s-OFDM) waveform) may be used.

Furthermore, the short PUCCH format may be, for example, a PUCCH format (PF) 0 or 2. The short PUCCH format may differ according to the number of bits of UCI (e.g., whether the number of bits is up to 2 bits or is more than 2 bits). For example, the PUCCH format 0 may be used for UCI up to 2 bits, and the PUCCH format 2 may be used for UCI more than 2 bits (see FIG. 2).

On the other hand, as illustrated in FIG. 1B, a long PUCCH is arranged over the larger number of symbols (e.g., 4 to 14 symbols) (PUCCH duration) than that of the short PUCCH. In FIG. 1B, the long PUCCH is not arranged on a given number of starting symbols of the slot, yet may be arranged on a given number of starting symbols. A start position in the time direction of the long PUCCH in the slot may be indicated by a start symbol index.

As illustrated in FIG. 1B, to obtain a power boosting effect, the long PUCCH may include a smaller number of frequency resources (e.g., one or two PRBs) than that of the short PUCCH or may include an equal number of frequency resources to that of the short PUCCH.

Furthermore, the long PUCCH may be subjected to frequency division multiplexing with the PUSCH in the slot. Furthermore, the long PUCCH may be subjected to time division multiplexing with the PDSCH in the slot. Furthermore, the long PUCCH may be arranged in a slot identical to that of the short PUCCH. For the long PUCCH, a single carrier (e.g., a DFT-s-OFDM waveform or an OFDM waveform that uses a Constant Amplitude Zero Auto Correction (CAZAC) sequence (e.g., a Computer Generated Sequence (CGS) or a Zhadoff-chu sequence) for a reference sequence of a transmission signal) may be used, or a multicarrier waveform (e.g., OFDM waveform) may be used.

Furthermore, the long PUCCH format may be, for example, a PUCCH format (PF) 1, 3 or 4. The long PUCCH format may differ according to the number of bits of UCI (e.g., whether the number of bits is up to 2 bits or is more than 2 bits). For example, the PUCCH format 1 may be used for UCI up to 2 bits, and the PUCCH format 3 or 4 may be used for UCI more than 2 bits (see FIG. 2).

Furthermore, the long PUCCH format may be controlled based on a number of bits N of UCI. For example, the PUCCH format 3 may be used for UCI more than N bits (or equal to or more than the N bits), and the PUCCH format 4 may be used for UCI up to the N bits (or less than the N bits) and more than 2 bits (see FIG. 2).

In this regard, FIG. 2 is only exemplary, and N=2 may hold or N>2 may hold. Furthermore, in FIG. 2, N of different values may be used between the PUCCH format 3 and the PUCCH format 4. For example, N=2 may be used for the PUCCH format 3, and N=100 may be used for the PUCCH format 4.

Furthermore, the long PUCCH format may differ according to whether or not to apply pre-DFT block-wise spreading (e.g., time-domain block-wise spreading that uses, for example, an Orthogonal Cover Code (OCC)). When, for example, the pre-DFT block-wise spreading is not applied, the PUCCH format 3 may be used, and, when the pre-DFT block-wise spreading is applied, the PUCCH format 4 may be used. In addition, post-DFT block-wise spreading (e.g., time-domain block-wise spreading that uses an OCC) may be applied to the PUCCH formats 1 or/and 4.

Furthermore, as illustrated in FIG. 1B, frequency hopping (intra-slot frequency hopping) of hopping frequency resources at a given timing in 1 slot may be enabled for the long PUCCH. Furthermore, although not illustrated, similar intra-slot frequency hopping may be enabled for a short PUCCH and/or a PUSCH including a plurality of symbols, too.

Figure 3A:
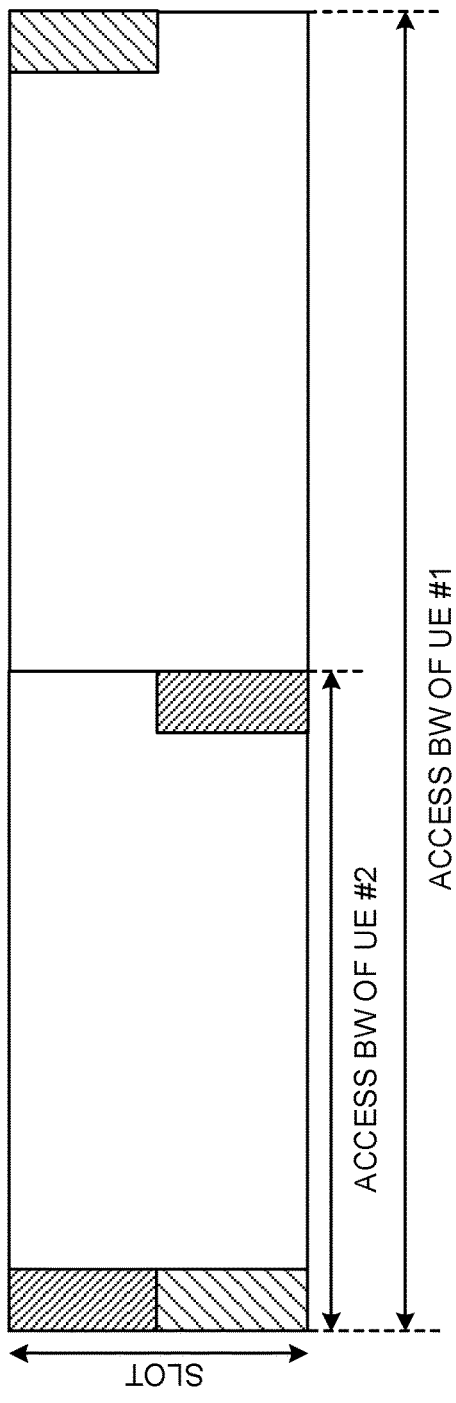
FIGS. 3A and 3B are diagrams illustrating one example of intra-slot frequency hopping of a PUCCH.
Figure 3B:
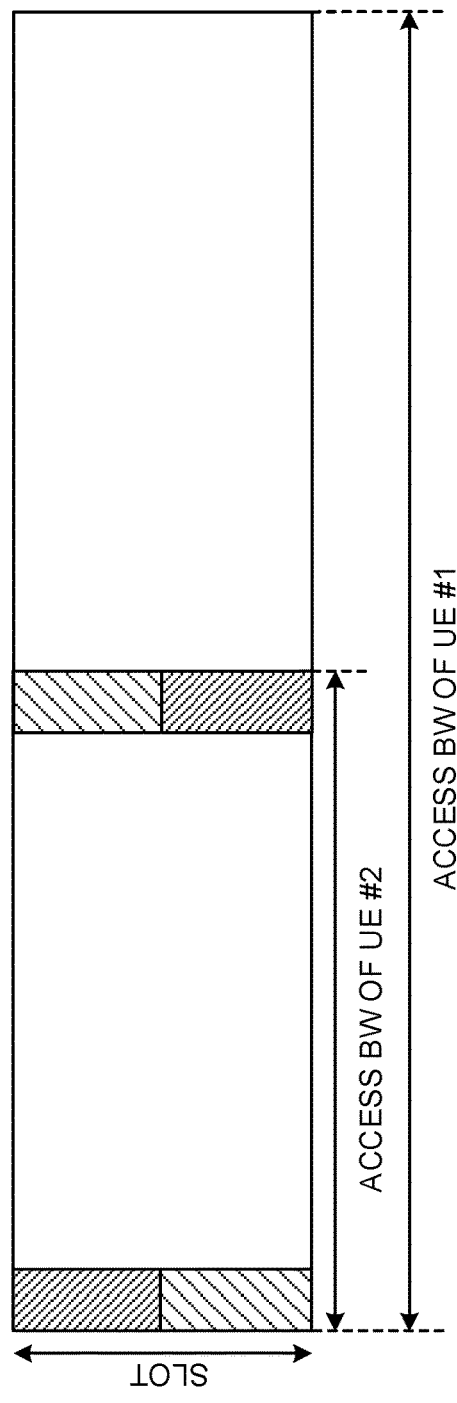

FIG. 3 is a diagram illustrating one example of intra-slot frequency hopping of a PUCCH (e.g., long PUCCH). In addition, FIGS. 3A and 3B exemplify the long PUCCH as one example of the PUCCH. However, intra-slot frequency hopping can be enabled likewise for other uplink channels/signals such as a short PUCCH, a PUSCH and an SRS, too.

As illustrated in FIGS. 3A and 3B, the above future radio communication system may configure an accessible bandwidth (access Bandwidth (BW)) per user terminal. In this regard, the access BW may be referred to as, for example, a carrier (a Component Carrier (CC) or a system band), or a partial frequency band ((partial band) or a Bandwidth Part (BWP)) in the carrier.

In, for example, FIGS. 3A and 3B, an access BW of a user terminal #1 is configured wider than an access BW of a user terminal #2. A distance (offset) between frequency resources on which a PUCCH is mapped may be different (FIG. 3A) or identical (FIG. 3B) between the user terminals #1 and #2 of the different access BWs.

Furthermore, it has been also studied for the above future radio communication system to make it possible to transmit UCI by using the long PUCCH over a plurality of slots. FIG. 4 is a diagram illustrating one example of the long PUCCH over a plurality of slots. In addition, FIG. 4 exemplifies the long PUCCH. However, other uplink channels/signals such as a PUSCH and an SRS are applicable likewise.

When the long PUCCH is arranged over a plurality of slots as illustrated in FIGS. 4A and 4B, a long PUCCH duration (PUCCH duration) and/or a start symbol in each slot may be identical. In addition, although not illustrated, the PUCCH duration and/or the start symbol in each slot may be different.

As illustrated in FIG. 4A, in a case of the long PUCCH over a plurality of slots, intra-slot frequency hopping may be enabled in each slot. Alternatively, as illustrated in FIG. 4B, frequency hopping (inter-slot frequency hopping) for hopping frequency resources on which the long PUCCH is mapped between a plurality of these slots may be enabled for the long PUCCH over a plurality of slots.

In addition, in a case of the long PUCCH over a plurality of slots, intra-slot frequency hopping (FIG. 4A) and inter-slot frequency hopping (FIG. 4B) are not enabled for an identical user terminal.

As described above, an access BW is assumed to differ per user terminal in the future radio communication systems (e.g., LTE Rel. 15~, 5G and NR) (e.g., FIG. 2). Hence, it is preferred to flexibly control an inter-slot frequency hopping pattern (e.g., a position and/or a hopping timing of each frequency resource to be hopped) of an uplink channel/signal (e.g., at least one of, for example, the above-described long PUCCH, shot PUCCH, PUSCH and SRS) per user terminal.

Hence, the inventors of this application have studied a method for flexibly controlling an inter-slot frequency hopping pattern of an uplink channel/signal, and reached the present invention.

The present embodiment will be described in detail below. Hereinafter, a PUCCH and/or a PUSCH (PUCCH/PUSCH) will be mainly described as one example of the uplink channel/signal. However, the present embodiment is applicable to other uplink channels and/or uplink signals such as an SRS, too. Furthermore, the "PUSCH" described below will collectively refer to a long PUCCH and/or a short PUCCH.

(First Aspect) The first aspect will describe frequency resources on which a PUCCH/PUSCH are mapped, and notification of information related to the frequency resources in a case where inter-slot frequency hopping is enabled for the PUCCH/PUSCH over a plurality of slots.

When inter-slot frequency hopping is enabled for the PUCCH/PUSCH over a plurality of slots, frequency resources on which the PUCCH/PUSCH are mapped may be hopped per given number of slots. A number of slots (the number of hopping slots) M that the frequency resources of the PUCCH/PUSCH hop may be determined based on the number of slots to which the PUCCH/PUSCH are allocated, or may be indicated by a higher layer signaling and/or DCI.

FIG. 5 is a diagram illustrating one example of inter-slot frequency hopping according to the first aspect. FIGS. 5A to 5D illustrate one example of inter-slot frequency hopping to be enabled for a PUCCH/PUSCH over a plurality of slots. In addition, FIGS. 5A to 5D are only exemplary, and the number of slots on which the PUCCH/PUSCH are mapped and/or the number of hopping slots M are not limited to those illustrated in FIGS. 5A to 5D. Furthermore, in FIGS. 5A to 5D, the frequency resource of each hop includes a given number of resource units (e.g., 1 or more PRBs or REs).

In, for example, FIGS. 5A and 5B, the frequency resource of the PUCCH/PUSCH is hopped per slot. As illustrated in FIG. 5A, the PUCCH/PUSCH over a plurality of slots may be mapped on a different frequency resource per slot. Alternatively, as illustrated in FIG. 5B, the PUCCH/PUSCH over a plurality of slots may be mapped on an identical resource per given number of slots (2 slots in this case).

In addition, in FIG. 5A, a bandwidth of the frequency resource of each hop may be calculated based on a BWP and the number of slots of the PUCCH/PUSCH. In addition, in FIG. 5B, a bandwidth between the frequency resources of each hop may be calculated based on a BWP (by, for example, multiplying the BWP with a given coefficient).

Furthermore, in FIG. 5C, the frequency resources of the PUCCH/PUSCH over a plurality of slots are hopped only once. In FIG. 5C, the number of hopping slots may be determined based on the number of slots to be allocated to the PUCCH/PUSCH/2.

Furthermore, in FIG. 5D, the frequency resources of the PUCCH/PUSCH are hopped per number of hopping slot M determined based on the number of slots to be allocated to the PUCCH/PUSCH. The number of hopping slots M may be determined by using a table (e.g., following table 1) that associates the number of hopping slots M and the number of slots of the PUCCH/PUSCH.

In, for example, FIG. 5D, the number of slots to be allocated to the PUCCH/PUSCH of a user terminal is 8. Therefore, the user terminal may determine the number of hopping slots M "2" associated with the number of slots "8" of the PUCCH/PUSCH by using the following table 1.

TABLE 1

| M | Number of Slots of PUCCH/PUSCH |
|---|---|
| 1 | 1 to 4 |
| 2 | 5 to 8 |
| 3 | 9 to 12 |
| 4 | 13 to 16 |
| ... | ... |

Furthermore, in FIG. 5D, in a case where a slot index starts from 0, a hopping boundary may be calculated immediately after an n*M−1 slot (n=1, 2, . . . , ceil(N/M) in this case). In this regard, M may be determined based on the number of slots to be allocated to the PUCCH/PUSCH as described above. Furthermore, M may be configured by a higher layer signaling. N may be the number of slots to be allocated to the PUCCH/PUSCH.

According to the first aspect, when inter-slot frequency hopping is enabled for the PUCCH/PUSCH over a plurality of slots, information (frequency resource information) related to the frequency resources on which the PUCCH/PUSCH are mapped may be notified from a radio base station to the user terminal.

In this regard, the frequency resource information may include information indicating an index (e.g., an index of a PRB and/or a Resource Element (RE) (PRB/RE)) of a specific frequency resource (e.g., a (starting) frequency resource of a first hop)), and information related to other frequency resources (e.g., frequency resources of second and subsequent hops). The information related to the other frequency resources may be, for example, information (frequency offset information) indicating a given frequency offset, or may be information indicating indices of the other frequency resources.

FIG. 6 is a diagram illustrating one example of a frequency offset in a case where inter-slot frequency hopping is enabled according to the first aspect. FIGS. 6A to 6D exemplify a case where inter-slot frequency hopping is enabled in a BWP configured to the user terminal. A bandwidth for which the inter-slot frequency hopping is enabled is not limited to the BWP, and may be an access BW of the user terminal.

Furthermore, in FIGS. 6A to 6D, an index #n (e.g., minimum index) of a given resource unit (e.g., PRB/RE) of the frequency resource of the first hop is notified to the user terminal.

Figure 6A:
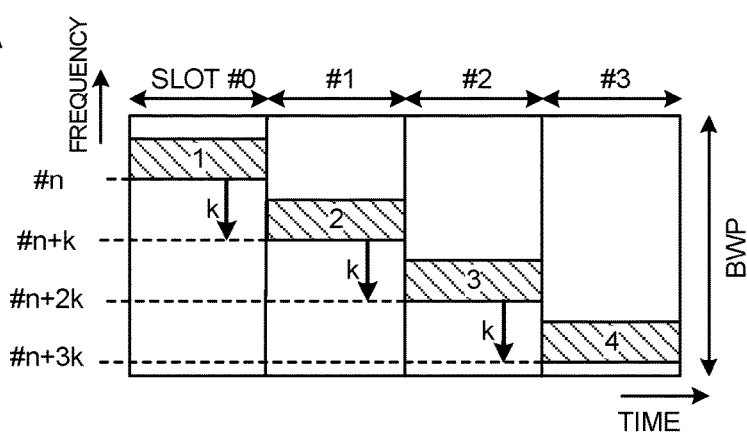
FIGS. 6A to 6D are diagrams illustrating one example of a frequency offset in a case where the inter-slot frequency hopping is enabled according to the first aspect.
Figure 6B:
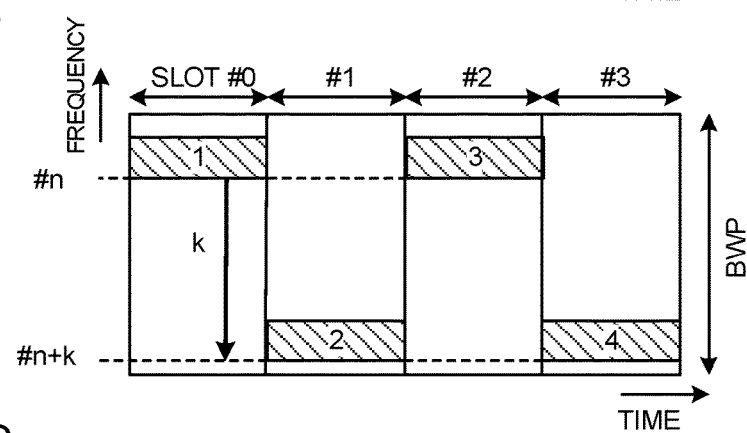

When, for example, the frequency resource of the PUCCH/PUSCH is hopped per slot as illustrated in FIGS. 6A and 6B, frequency offset information indicating a frequency offset k from a frequency resource of a previous hop (previous slot) may be notified from the radio base station to the user terminal.

In FIG. 6A, based on an addition result of the index #n of the frequency resource of the previous hop (e.g., the frequency resource of the first slot (slot #0)), and the frequency offset k (k=integer), the user terminal may determine an index #n+k (e.g., a minimum PRB index or RE index) of a frequency resource of a next slot (e.g., the frequency resource of the second hop (slot #1)).

In FIG. 6B, based on an addition result or a subtraction result of the frequency resource of the previous hop (e.g., the index #n of the frequency resource of the first slot (slot #0)), and the frequency offset k (k=integer), the user terminal may determine an index #n+k or #(n+k)−k (e.g., a minimum PRB index or RE index) of frequency resources of subsequent slots (e.g., the frequency resources of second, third and fourth hops (slots #1, #2 and #3)).

Figure 6C:
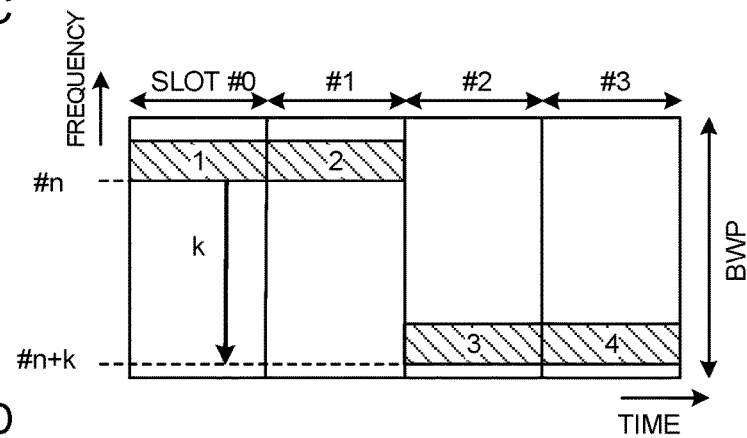

Furthermore, when the frequency resources of the PUCCH/PUSCH are hopped only once as illustrated in FIG. 6C, the frequency offset information indicating the frequency offset k from the frequency resource of the first hop may be notified from the radio base station to the user terminal.

In FIG. 6C, based on an addition result of the index #n of the frequency resource of the first hop, and the frequency offset k (k=integer), the user terminal may determine the index #n+k (e.g., a minimum PRB index or RE index) of the frequency resource of the second hop.

Figure 6D:
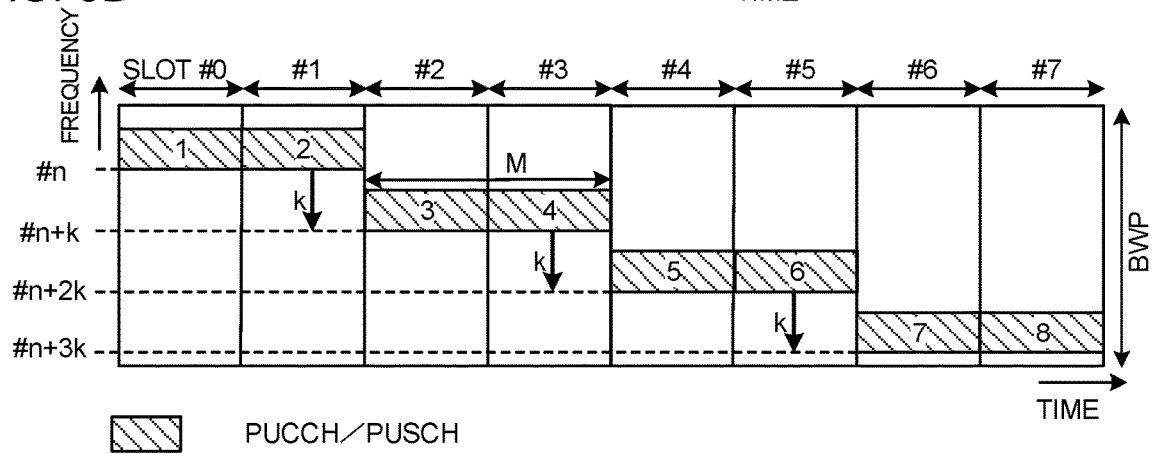

Furthermore, when the frequency resources of the PUCCH/PUSCH are hopped per number of hopping slots M as illustrated in FIG. 6D, the frequency offset information indicating the frequency offset k from the frequency resource of the previous hop may be notified from the radio base station to the user terminal.

In FIG. 6D, based on an addition result of an index of the frequency resource of the previous hop (e.g., the minimum index #n of the PRB or the RE), and the frequency offset k (k=integer), the user terminal may determine an index (e.g., the minimum index #n+k of the PRB or the RE) of a frequency resource of a next hop.

The examples where the frequency offset information indicating the frequency offset k from the frequency resource of the previous hop is notified from the radio base station to the user terminal have been described above with reference to FIGS. 6A to 6D. However, the frequency offset k is not limited to this. FIG. 7 is a diagram illustrating change examples of a frequency offset in a case where inter-slot frequency hopping is enabled according to the first aspect. In addition, FIGS. 7A and 7B illustrate the change examples of the frequency offset k as one example of an inter-slot frequency hopping pattern in FIG. 6A. However, the change examples are applicable to FIGS. 6B to 6D, too.

In FIG. 7A, frequency offset information indicating a frequency offset $k_i$ of an ith (i=2 to 4 in FIG. 7A) from an index #m of a frequency resource that serves as a reference (reference frequency resource) is notified from the radio base station to the user terminal. Information indicating the index #m may be notified (configured) to the user terminal by a higher layer signaling. In FIG. 7A, based on the index #m of the reference frequency resource and the frequency offset $k_i$ ($k_i$=integer) of the ith hop, the user terminal may determine an index #m+$k_i$ (e.g., a minimum PRB index or RE index) of the frequency resource of the ith hop.

In FIG. 7B, the frequency offset information indicating the frequency offset $k_i$ of the ith (i=2 to 4 in FIG. 7B) from an index #1 (e.g., a PRB or RE index) of an edge of an access BW (a BWP in this case) of the user terminal is notified from the radio base station to the user terminal. The index #1 may be an index (e.g., the PRB index or the RE index) of an edge of the access BW on a side opposite to the frequency resource of the first hop.

In FIG. 7B, based on the index #1 of the edge of the access BW and the frequency offset $k_i$ ($k_i$=integer), the user terminal may determine an index #1+$k_i$ (e.g., a minimum PRB index or RE index) of the frequency resource of the ith hop.

FIG. 8 is a diagram illustrating one example of multiplexing of a plurality of user terminals in a case where inter-slot frequency hopping is enabled according to the first aspect. FIG. 8A illustrates a case where a frequency resource of a first hop of a user terminal #2 is equal to a frequency resource of a second hop of a user terminal #1. Furthermore, in FIG. 8A, based on the same frequency offset k as that in FIG. 6A and an index of an i−1th frequency resource, a frequency resource of the ith (i=2 to 4 in FIG. 8A) hop of each of the user terminals #1 and #2 is determined.

Figure 8A:
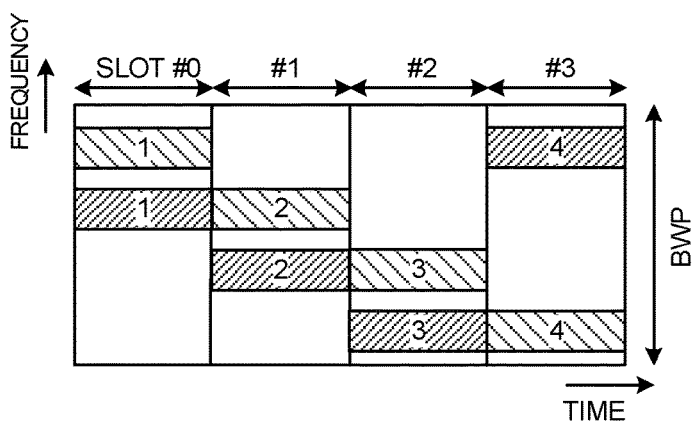
FIGS. 8A to 8D are diagrams illustrating one example of multiplexing of a plurality of user terminals in a case where the inter-slot frequency hopping is enabled according to the first aspect.
Figure 8B:
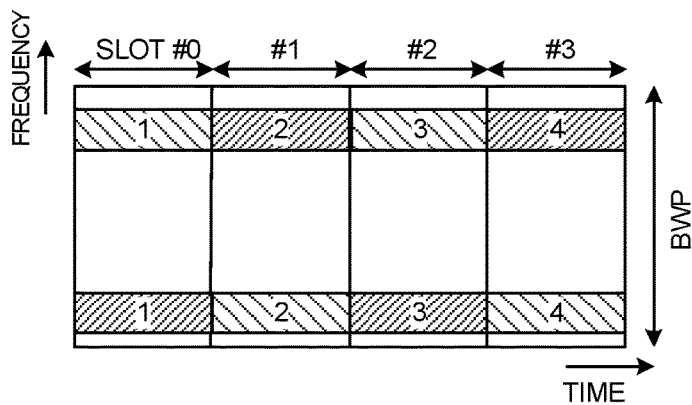
Figure 8C:
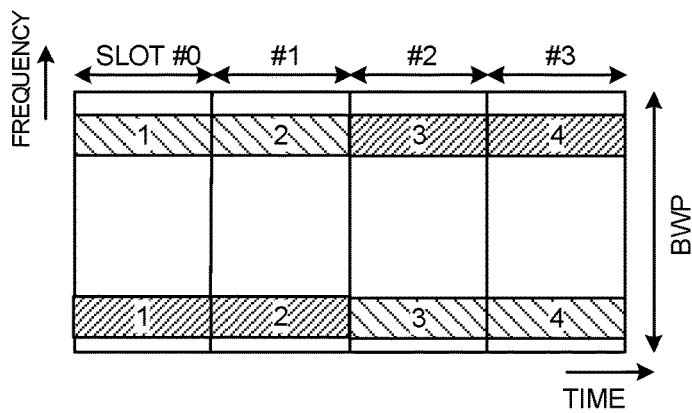
Figure 8D:
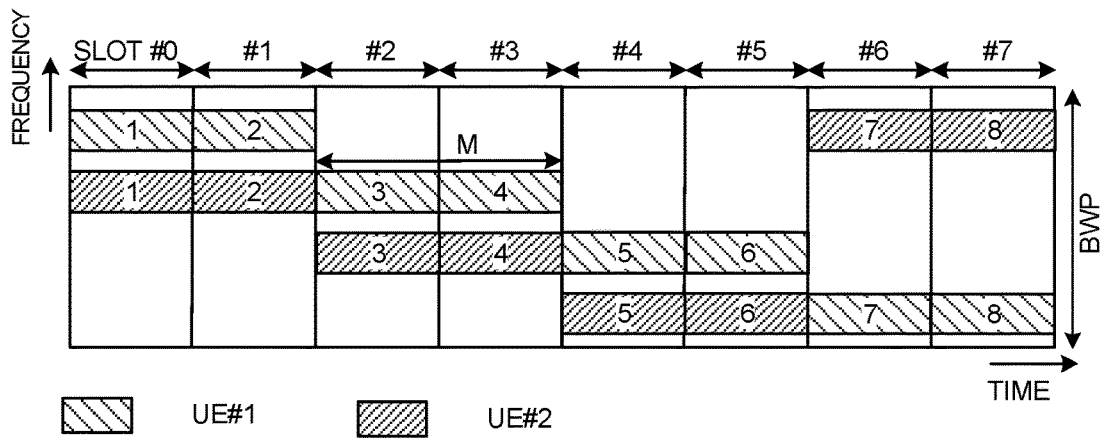

In FIG. 8A, the frequency resource of a fourth hop of the user terminal #2 is smaller than that of the edge of the BWP, and therefore the frequency resource of the fourth hop is determined identical to the frequency resource of the first hop of the user terminal #1. The same applies to FIG. 8D, too.

Thus, when the index of the frequency resource of the ith hop is not included in the access BW (e.g., BWP) configured to the user terminal, the ith frequency resource may be determined based on a surplus of the index and a resource unit (e.g., the number of PRBs or the number of REs) in the BWP.

According to the first aspect, when inter-slot frequency hopping is enabled for a PUCCH/PUSCH, frequency resource information (e.g., the information indicating the frequency offset k illustrated in FIG. 6A to 6D, 7A or 7B) is notified from the radio base station to the user terminal, so that the user terminal can appropriately control an inter-slot frequency hopping pattern based on the frequency resource information.

(Second Aspect)

The second aspect differs from the first aspect in that, when inter-slot frequency hopping is enabled for a PUCCH/PUSCH over a plurality of slots, information (frequency resource information) related to frequency resources on which the PUCCH/PUSCH are mapped is not explicitly notified from a network (e.g., radio base station). That is, according to the second aspect, a user terminal determines frequency resources on which the PUCCH/PUSCH are mapped, based on implicit information.

More specifically, based on information (intra-slot FH information) related to the frequency resources of the PUCCH/PUSCH for which intra-slot frequency hopping is enabled, the user terminal may determine the frequency resources on which the PUCCH/PUSCH for which inter-slot frequency hopping is enabled are mapped.

In this regard, the intra-slot FH information may include information indicating an index (e.g., an index of a PRB and/or a Resource Element (RE) (PRB/RE)) of a specific frequency resource (e.g., a (starting) frequency resource of a first hop) of the PUCCH/PUSCH for which intra-slot frequency hopping is enabled, and information related to other frequency resources (e.g., frequency resources of second and subsequent hops). The information related to the other frequency resources may be, for example, information (frequency offset information) indicating a given frequency offset, or may be information indicating indices of the other frequency resources.

Based on the frequency resources indicated by the intra-slot FH information, the user terminal may determine the frequency resources of the PUCCH/PUSCH for which inter-slot frequency hopping is enabled. For example, the user terminal may apply an intra-slot frequency hopping pattern indicated by the intra-slot FH information as is to the inter-slot frequency hopping. Alternatively, the intra-slot frequency hopping pattern indicated by the intra-slot FH information may be multiplied by m (m=integer) and applied to inter-slot frequency hopping.

In addition, the intra-slot FH information may include information related to time resources of the PUCCH/PUSCH for which intra-slot frequency hopping is enabled. Based on the time resources indicated by the intra-slot FH information, the user terminal may determine the time resources of the PUCCH/PUSCH for which inter-slot frequency hopping is enabled.

Figure 9A:
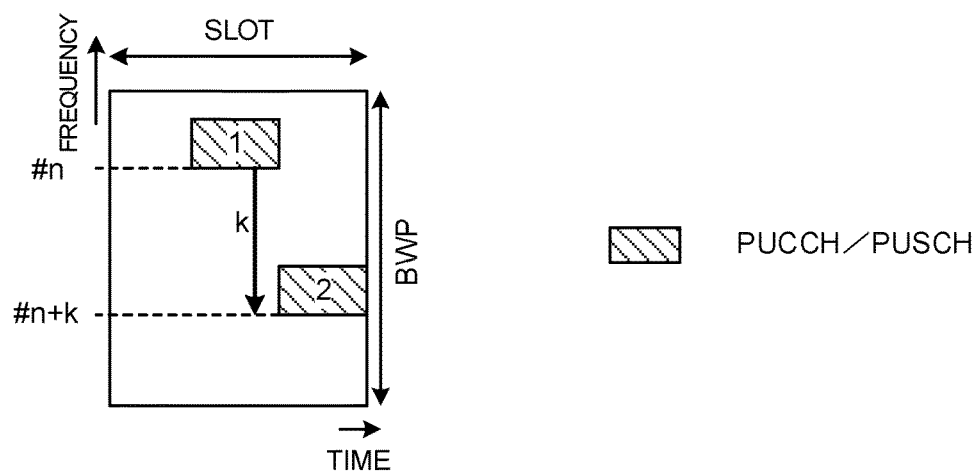
FIGS. 9A to 9C are diagrams illustrating one example of determination of frequency resources of a PUCCH/PUSCH for which inter-slot frequency hopping is enabled according to a second aspect.
Figure 9B:
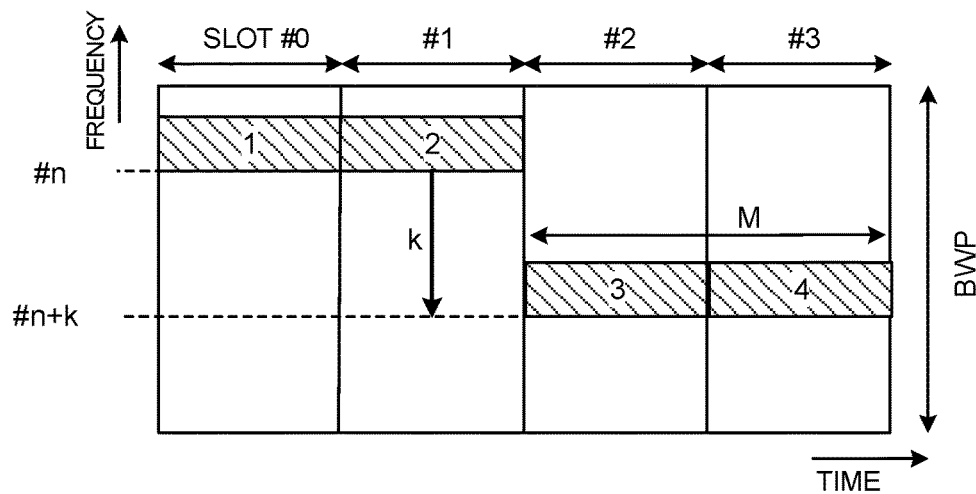
Figure 9C:
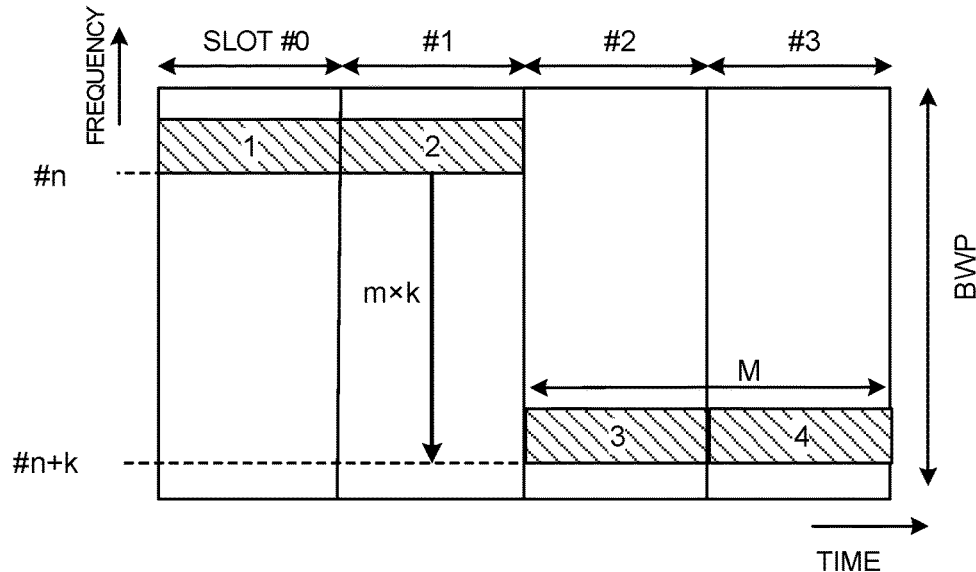

FIG. 9 is a diagram illustrating one example of determination of frequency resources of a PUCCH/PUSCH for which inter-slot frequency hopping is enabled according to the second aspect. In this regard, a case where a frequency offset k from a frequency resource of a previous hop is used will be described with reference to FIGS. 9A to 9C. However, the present invention is applicable as appropriate to a case, too, where the frequency offset k (FIG. 7A) from a reference frequency resource or the frequency offset k (FIG. 7B) from an access BW (e.g., BWP) of the user terminal is used.

In FIG. 9A, according to intra-slot frequency hopping, the intra-slot FH information indicating an index #n of the frequency resource of the first hop, and/or the frequency offset k is notified to the user terminal.

In FIG. 9B, the intra-slot frequency hopping pattern in FIG. 9A may be applied to inter-slot frequency hopping based on the intra-slot FH information. In addition, in FIG. 9B, a number of hopping slots (a hopping time or a hopping boundary) M may be determined based on the number of slots to which the PUCCH/PUSCH are allocated, may be configured by a higher layer signaling, or may be defined in advance.

In FIG. 9C, an m (m=positive integer) multiple of the intra-slot frequency hopping pattern in FIG. 9A may be applied to inter-slot frequency hopping based on the intra-slot FH information. In this regard, m may be indicated by a higher layer signaling and/or a physical layer signaling (e.g., DCI), or may be derived by the user terminal itself according to a given rule. For example, m may be determined based on a user terminal group and/or a user terminal category (e.g., enhanced Mobile Broad Band (eMBB), enhanced Machine Type Communication (eMTC) or Ultra Reliable and Low Latency Communications (URLLC)).

In addition, as described above, the intra-slot FH information is notified from the radio base station to the user terminal. However, the intra-slot frequency hopping pattern (e.g., at least one of the frequency resource, the frequency offset, the time resource and the hopping timing) may be derived based on at least one of the access BW of the user terminal (UE BWP), a cell bandwidth (cell BW), a UL BWP and a DL BWP.

Furthermore, the examples where the frequency resources of the PUCCH/PUSCH for which inter-slot frequency hopping is enabled are determined based on the intra-slot FH information have been described with reference to FIGS. 9B and 9C. However, in addition to the frequency resources, the time resources (e.g., the number of symbols per slot) of the PUCCH/PUSCH may be controlled.

Furthermore, even when intra-slot frequency hopping is enabled for a PUCCH/PUSCH over a plurality of slots, enabling of intra-slot frequency hopping in a certain slot may be controlled based on the number of available symbols (e.g., the number of UL symbols) in the certain slot. When, for example, the number of available symbols in the certain slot is smaller than a given threshold X, enabling of intra-slot frequency hopping for the slot may be turned off. In addition, X may be, for example, 7 or 4.

According to the second aspect, when inter-slot frequency hopping is enabled for a PUCCH/PUSCH, the user terminal can appropriately control an inter-slot frequency hopping pattern without being notified of frequency resource information described in the first aspect from the radio base station, so that it is possible to reduce an overhead.

(Third Aspect)

The third aspect will describe a timing (hopping boundary) at which a frequency resource is hopped in a case where inter-slot frequency hopping is enabled for a PUCCH/PUSCH over a plurality of slots.

<First Determination Method>

The hopping boundary of inter-slot frequency hopping may be determined based on the number of slots that satisfies a given condition. The given condition may be, for example, a slot whose number of symbols on which a PUCCH/PUSCH can be transmitted in a slot is a given threshold or more (or exceeds the given threshold).

The number of symbols (e.g., the number of UL symbols) on which the PUCCH/PUSCH can be transmitted in the slot may be indicated by a higher layer signaling and/or a physical layer signaling. For example, the number of symbols may be indicated by Slot Format Information (SFI).

Furthermore, the number of slots to which the PUCCH/PUSCH are allocated may be indicated by a higher layer signaling and/or a physical layer signaling.

Figure 10A:
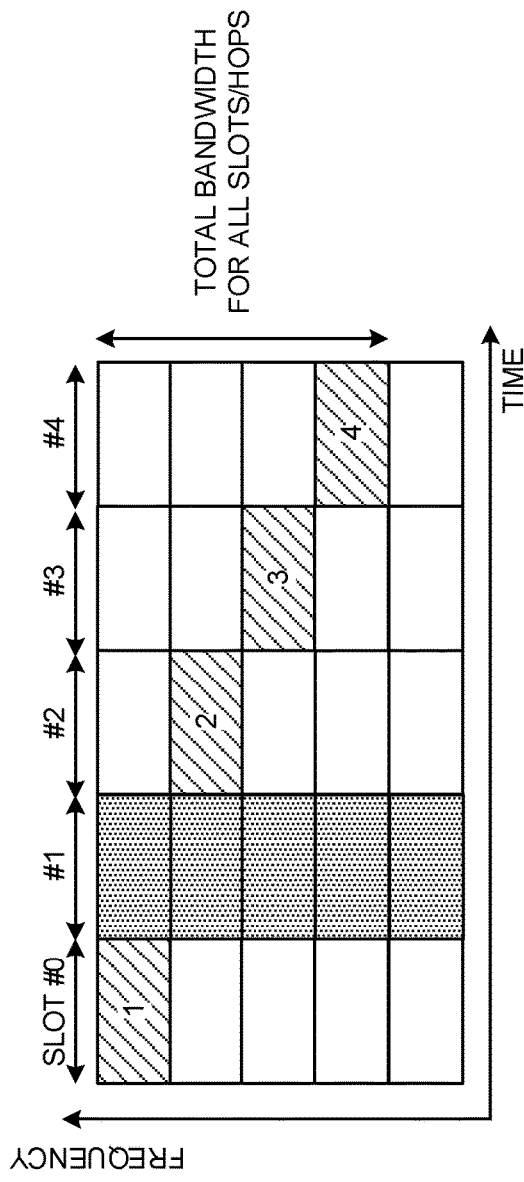
FIGS. 10A and 10B are diagrams illustrating a first determination example of a hopping boundary of inter-slot frequency hopping according to a third aspect.

FIG. 10 is a diagram illustrating a first determination example of the hopping boundary of inter-slot frequency hopping according to the third aspect. In FIG. 10A, a slot #1 is a slot that does not satisfy the above given condition, and other slots satisfy the above given condition.

Figure 10B:
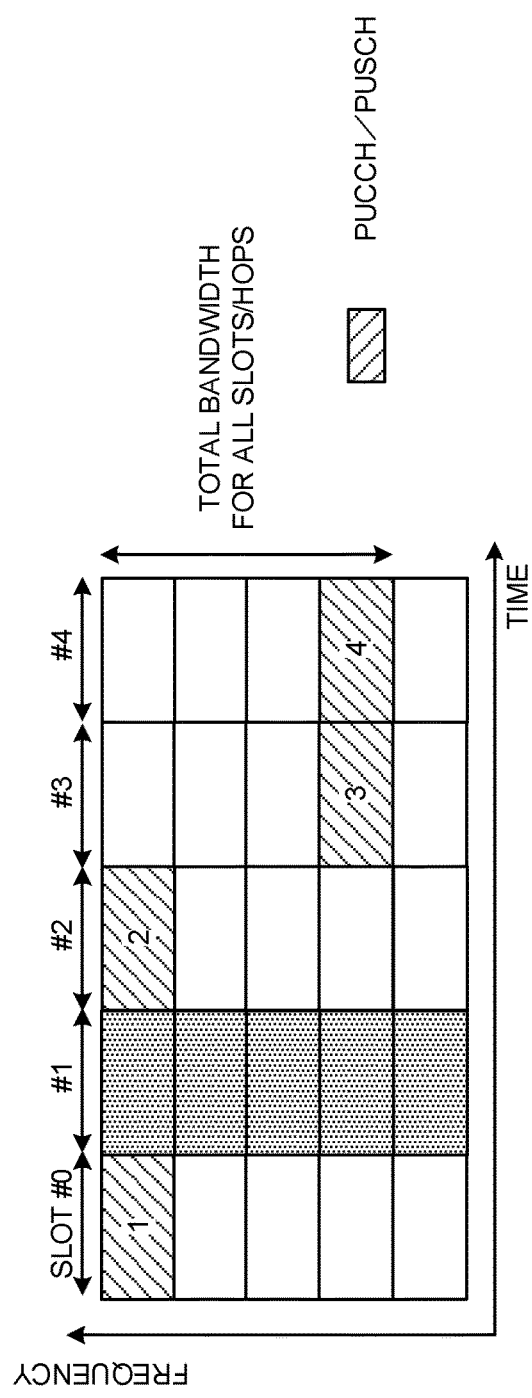

As illustrated in FIGS. 10A and 10B, the user terminal may not count the slot #1 that does not satisfy the above given condition as a transmission slot of the PUCCH/PUSCH. In this case, the user terminal may determine the frequency resources on which the PUCCH/PUSCH are mapped during inter-slot frequency hopping without taking the slot #1 into account.

In, for example, FIG. 10A, a next slot #2 of the slot #1 is a frequency resource of a second hop. Furthermore, in FIG. 10B, the number of hopping slots M=2 is configured, and therefore the frequency resource of the slot #2 is the same as that of a slot #0 since the slot #1 is not counted.

According to the first determination method, an inter-slot frequency hopping pattern is determined by taking into account only slots on which a PUCCH/PUSCH can be transmitted, so that it is possible to more effectively obtain a frequency diversity effect of the PUCCH/PUSCH.

<Second Determination Method>

Alternatively, the hopping boundary of inter-slot frequency hopping may be determined without being based on the number of slots that satisfies the above given condition. Differences of the second determination method from the first determination method will be mainly described.

Figure 11A:
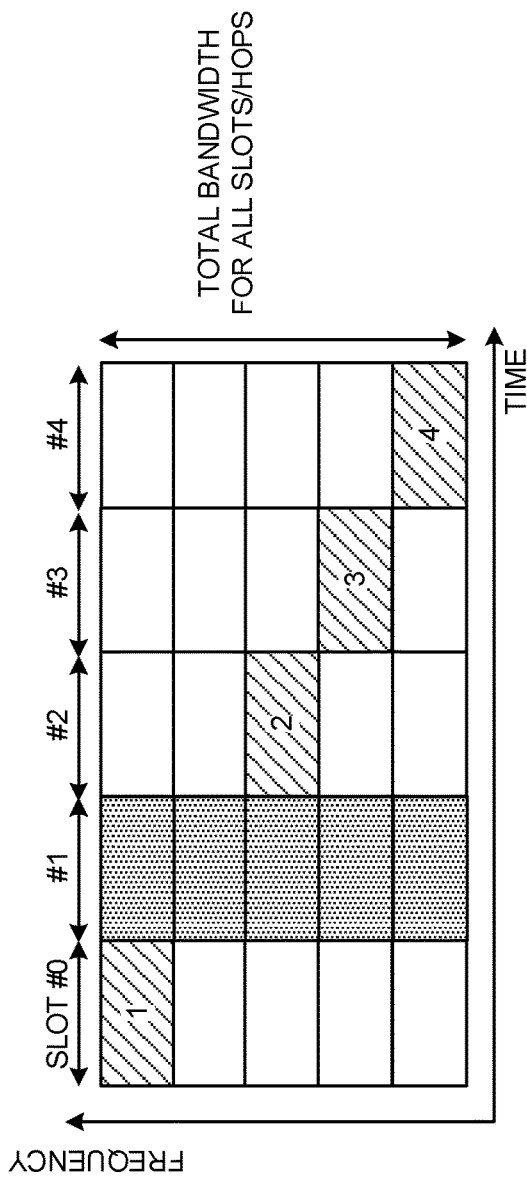
FIGS. 11A and 11B are diagrams illustrating a second determination example of a hopping boundary of inter-slot frequency hopping according to the third aspect.
Figure 11B:
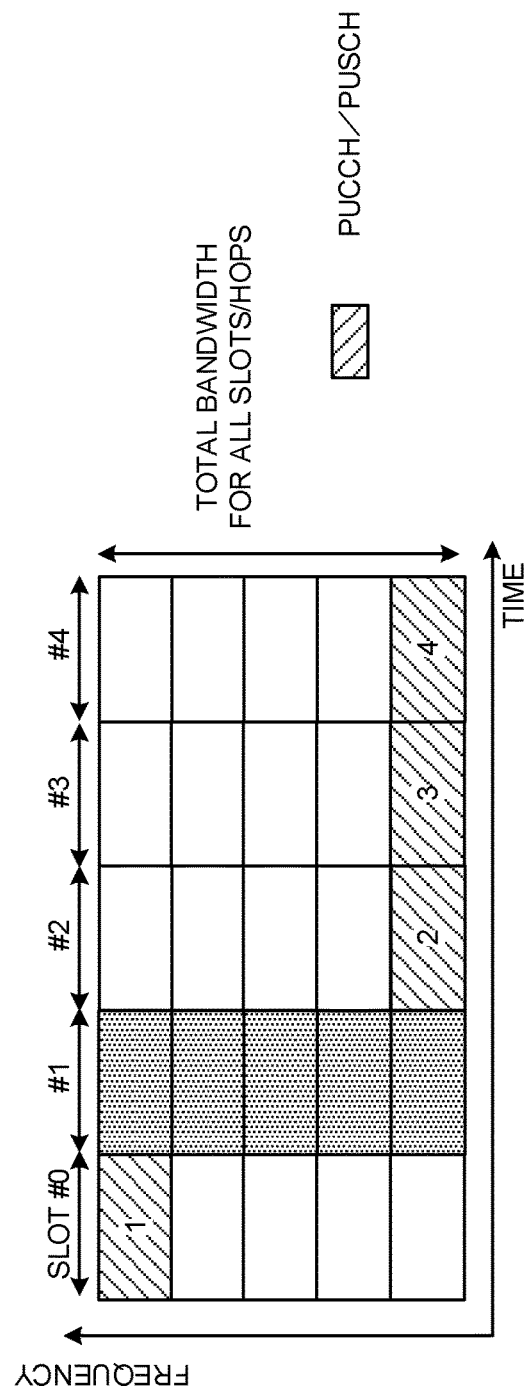

FIG. 11 is a diagram illustrating the second determination example of the hopping boundary of inter-slot frequency hopping according to the third aspect. As illustrated in FIGS. 11A and 11B, the user terminal may count the slot #1 that does not satisfy the above given condition as a transmission slot of the PUCCH/PUSCH. In this case, the user terminal may determine frequency resources on which the PUCCH/PUSCH are mapped during inter-slot frequency hopping by taking the slot #1 into account.

In, for example, FIG. 11A, the next slot #1 of the slot #0 becomes a frequency resource of the second hop, and therefore the frequency resource of the slot #2 is a frequency offset that is two times as that of the frequency resource of the slot #1. Furthermore, in FIG. 11B, the number of hopping slots M is configured to 2, and therefore the frequency resource of the slot #2 becomes a hopped frequency resource since the slot #1 is counted.

According to the second determination example, the inter-slot frequency hopping pattern is determined irrespectively of slots on which the PUCCH-PUSCH can be transmitted, so that it is possible to simplify the inter-slot frequency hopping pattern.

According to the above third aspect, when inter-slot frequency hopping is enabled for the PUCCH/PUSCH, it is possible to appropriately control the hopping boundary.

(Fourth Aspect)

The fourth aspect will describe in detail a signaling in a case where inter-slot frequency hopping is enabled for a PUCCH.

A plurality of sets (PUCCH resource sets or parameter sets) each including one or more parameters related to a resource for a PUCCH (PUCCH resource) is configured (notified from a radio base station) to a user terminal in advance by a higher layer signaling. One of a plurality of these PUCCH resource sets is indicated by using a given field in Downlink Control Information (DCI). The user terminal controls transmission of the PUCCH based on the PUCCH resource set indicated by the given field value in the DCI.

When inter-slot frequency hopping is enabled for the PUCCH, each PUCCH resource set configured by the higher layer signaling may include frequency resource information described in, for example, the first aspect.

FIG. 12 is a diagram illustrating one example of PUCCH resource sets according to the fourth aspect. As illustrated in FIG. 12A, each value of a given field of DCI indicates a PUCCH resource set. In, for example, FIG. 12A, the given field values "00", "01", "10" and "11" indicate PUCCH resource sets #0, #1, #2 and #3, respectively.

As illustrated in FIG. 12B, each PUCCH resource set may include at least one of following parameters.

Information indicating a start symbol of a PUCCH

Information indicating the number of symbols of the PUCCH in a slot

Information (e.g., a start PRB index) for identifying a frequency resource (e.g., start PRB) of a first hop of the PUCCH Information indicating the number of resource units (e.g., the number of PRBs) that compose the frequency resources of the PUCCH Information indicating whether frequency hopping is enabled or is not enabled (turned on or turned off)

Information related to frequency resources of second and subsequent hops in a case where frequency hopping is enabled (the information may be, for example, information indicating the frequency offset illustrated in FIGS. 4A to 4C or information indicating an index of each frequency resource of the second and subsequent hops)

Information (information indicating a frequency hopping mode) indicating which one of intra-slot frequency hopping and inter-slot frequency hopping is enabled for the PUSCH over a plurality of slots.

In this regard, at least one parameter illustrated in FIG. 12B may not be dynamically indicated as a PUCCH resource set, and may be semi-statically configured by a higher layer signaling.

In addition, a PUCCH format may not be explicitly notified to the UE, and the user terminal (UE) may estimate the PUCCH format from the notified PUCCH resource. For example, when the number of symbols of the notified PUCCH is smaller than 4, the UE can estimate that the PUCCH format of a short PUCCH has been notified. Furthermore, in FIG. 12A, each PUCCH resource set may indicate a PUCCH resource of one PUCCH format. Furthermore, the PUCCH format may be different per PUCCH resource set. Furthermore, at least one parameter in FIG. 12B may be indicated per PUCCH resource set and per PUCCH format. For example, whether frequency hopping is enabled or is not enabled for each PUCCH resource set may be indicated for each of PUCCH formats 0 to 4.

Furthermore, each given field value in the DCI illustrated in FIG. 12A may indicate the PUCCH resource set of each PUCCH format. For example, the given field value "00" may indicate a PUCCH resource set #0 of the PUCCH format 0, and a PUCCH resource set #4 of the PUCCH format 1. This, an identical given field value may indicate identical and/or different PUCCH resource sets between PUCCH formats.

According to the fourth aspect, when inter-slot frequency hopping is enabled for a PUCCH, a PUCCH resource set including frequency resource information (e.g., information indicating a frequency offset k illustrated in FIGS. 6A to 6D, 7A or 7B) of the PUCCH is indicated to the user terminal, so that the user terminal can appropriately control an inter-slot frequency hopping pattern of the PUCCH based on the frequency resource information.

(Fifth Aspect)

The fifth aspect will describe a signaling in a case where inter-slot frequency hopping is enabled for a PUSCH.

DCI for scheduling a PUSCH in one or a plurality of slots may include information (time resource information) indicating symbols and/or slots used to transmit the PUSCH in the slots. The time resource information may be, for example, information (e.g., an index associated with a start symbol index and/or the number of symbols in a given table) indicating an index of a starting symbol (start symbol index) and/or the number of symbols (a time duration or a duration) to which the PUSCH is allocated in the slots, or may be information indicating the number of slots.

Furthermore, one of a plurality of PUSCH configurations may be configured to a user terminal by a higher layer signaling (e.g., RRC signaling). A plurality of these PUSCH configurations include a default PUSCH configuration (also referred to as, for example, a configuration 1 or a default configuration) used until the PUSCH configuration is configured by the higher layer signaling.

Frequency resources are allocated to the PUSCH in a given resource unit (e.g., a PRB or a group (Resource Block Group (RBG)) including one or more PRBs). A size of the RBG (an RBG size or the number of PRBs in the RBG) may be defined per PUSCH configuration according to the number of PRBs in an access BW (e.g., BWP) of the user terminal.

When, for example, the access BW includes $X_0$ to $X_1$ PRBs, an RBG size 1 may be applied in a case of a PUSCH configuration #1, and an RBG size 2 may be applied in a case of a PUSCH configuration #2. Furthermore, when the access BW includes $X_1+1$ to $X_2$ PRBs, an RBG size 3 may be applied in a case of the PUSCH configuration #1, and an RBG size 4 may be applied in a case of the PUSCH configuration #2.

This RBG size associated with the access BW per PUSCH configuration may be defined in a table. RBG sizes in the table are defined per stage of the number of PRBs of the access BW. The number of stages of the number of PRBs is, for example, 4 to 6, and the above table may include 4 to 6 records. In addition, the table may be common between a PUSCH and a PUCCH, or may be specific to the PUSCH and the PUCCH. Furthermore, the RBG size may be fixed irrespectively of a PUSCH duration (the number of symbols).

When inter-slot frequency hopping is enabled for the PUSCH configured as described above, the frequency resource information described in, for example, the first aspect may be indicated by DCI. Furthermore, whether frequency hopping is enabled or is not enabled may be indicated by the DCI.

In this regard, the DCI may be DCI (also referred to as, for example, common DCI or fallback DCI) arranged in a search space (common search space) that is common between one or more user terminals, and/or DCI (also referred to as, for example, dedicated DCI or non fallback DCI) that is arranged in a user terminal-specific search space.

The fallback DCI is DCI to which contents is not configured by a user terminal-specific higher layer signaling (e.g., RRC signaling). The non fallback DCI is DCI to which contents can be configured by the user terminal-specific higher layer signaling (e.g., RRC signaling). The non fallback DCI may be used for scheduling of the PUSCH, or may be referred to as, for example, a UL grant.

FIG. 13 is a diagram illustrating one example of DCI according to the fifth aspect. As illustrated in FIG. 13, the DCI (the fallback DCI and/or the non fallback DCI) may indicate at least one of pieces of information. • Information indicating a start symbol of a PUSCH Information indicating the number of symbols of a PUSCH in a slot (c) Allocation information of frequency resources to the PUSCH (a) Information indicating whether frequency hopping is enabled or is not enabled (turned on or turned off)

(b) Information related to frequency resources of second and subsequent hops in a case where frequency hopping is enabled (e.g., information (that may be referred to as, for example, a gap or a bandwidth) indicating the frequency offset illustrated in FIGS. 6A to 6D, 7A or 7B or information indicating an index (e.g., a PRB index or an RE index) of each frequency resource of the second and subsequent hops)

(d) Information (information indicating a frequency hopping mode) indicating which one of intra-frequency hopping and inter-slot frequency hopping is enabled for the PUSCH over a plurality of slots More specifically, each information illustrated in FIG. 13 may be indicated by different fields (also referred to as, for example, parameters or Information Elements (IEs)) in the DCI. Alternatively, at least two pieces of information may be indicated by a single field (joint field) in the DCI.

For example, (a) the information indicating whether or not frequency hopping is enabled or is not enabled is indicated by the single field in the DCI. Both of (b) the information related to the frequency resources of the second and subsequent hops and (c) the allocation information of the frequency resources to the PUSCH may be indicated by another singled field (e.g., resource allocation field) in the DCI.

Alternatively, all of (a) the information indicating whether frequency hopping is enabled or is not enabled, (b) the information related to the frequency resources of the second and subsequent hops, and (c) the allocation information of the frequency resources to the PUSCH may be indicated by a single field (e.g., resource allocation field) in the DCI.

Furthermore, (d) the information indicating which one of intra-slot frequency hopping and inter-slot frequency hopping is enabled for the PUSCH over a plurality of slots may be indicated by a joint field identical to the information (e.g., the information indicating the start symbol and/or the information indicating the number of symbols in the slot) related to time resources of the PUSCH, or may be indicated by different fields in the DCI.

FIG. 14 is a diagram illustrating one example of a joint field in DCI according to the fifth aspect. In FIG. 14A, the joint field (e.g., resource allocation field) of X bits in the DCI indicates (a) the information indicating whether or not frequency hopping is enabled or is not enabled, (b) the information related to the frequency resources of the second and subsequent hops, and (c) the allocation information of the frequency resources to the PUSCH.

In, for example, FIG. 14A, ceil [log (Y RBs*(Y RBs+1))] bits indicate (a) the information indicating whether or not frequency hopping is enabled or is not enabled (e.g., a number of PRBs Y), and Z bits indicate (b) the information related to the frequency resources of the second and subsequent hops and (c) the allocation information of the frequency resources to the PUSCH.

A number of bits X of the joint field may be a fixed value, may be a value configured by a higher layer signaling, or may be a value derived based on an access BW of the user terminal (e.g., UL BWP). When, for example, X is fixed, X=15 may hold when the DCI is the fallback DCI, and X=25 may hold when the DCI is the non fallback DCI.

Furthermore, the number of bits Z indicating (b) the information related to the frequency resources of the second and subsequent hops and (c) the allocation information of the frequency resources to the PUSCH may be a fixed value, or may be a value derived based on a bandwidth S of the access BW of the user terminal (e.g., UL BWP) or a total bandwidth S subjected to frequency hopping. When, for example, the bandwidth S of the access BW or the total bandwidth S to be subjected to frequency hopping is a given threshold or less, Z=1 bit may hold, and, when the bandwidth S is larger than the given threshold, Z=2 bits may hold.

FIG. 14B illustrates information indicated by each bit value in a case of Z=1. For example, a bit value "0" indicates that frequency hopping is not enabled, and a bit value "1" indicates a frequency offset "½*S" in a case where frequency hopping is enabled.

FIG. 14C illustrates information indicated by each bit value in a case of Z=2. For example, a bit value "00" indicates that frequency hopping is not enabled, and bit values "01", "10" and "11" indicate frequency offsets "½*S", "+¼*S" and "−¼*S" in a case where frequency hopping is enabled, respectively.

The user terminal may control inter-slot frequency hopping of the PUSCH based on (a) the information indicating whether or not frequency hopping is enabled or is not enabled and indicated by the ceil [log (Y RBs*(Y RBs+1))] bits, and the frequency offset indicated by the bit value of the Z bits.

In addition, at least one of user data, higher layer control information and message 3 may be conveyed on the PUSCH for which the above inter-slot frequency hopping is enabled. The message 3 is higher layer control information that is transmitted from the user terminal according to a Random Access Response (an RAR or message 2) from a radio base station in a random access procedure.

According to the fifth aspect, when inter-slot frequency hopping is enabled for the PUSCH, DCI including frequency resource information of the PUSCH (e.g., information indicating the frequency offset k illustrated in FIGS. 6A to 6D, 7A or 7B) is transmitted from the radio base station, so that the user terminal can appropriately control an inter-slot frequency hopping pattern of the PUSCH based on the frequency resource information.

(Radio Communication System)

The configuration of the radio communication system according to the present embodiment will be described below. This radio communication system is applied the radio communication method according to each of the above aspects. In addition, the radio communication method according to each of the above aspects may be each applied alone or may be applied by combining at least two aspects.

Figure 15:
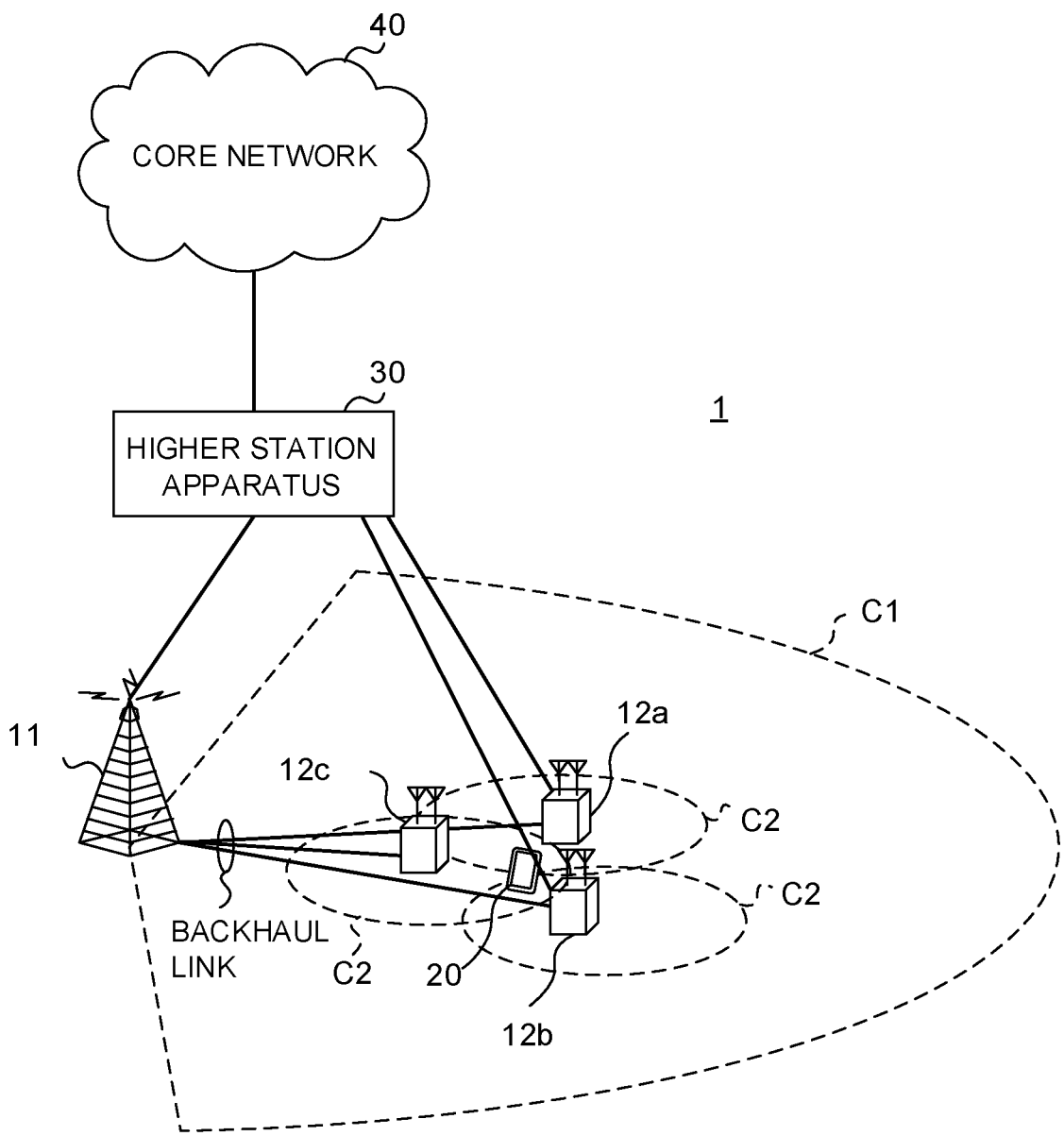
FIG. 15 is a diagram illustrating one example of a schematic configuration of a radio communication system according to the present embodiment.

FIG. 15 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system. In this regard, the radio communication system 1 may be referred to as SUPER 3G LTE-Advanced (LTE-A), IMT-Advanced, 4G, 5G Future Radio Access (FRA) or New Radio Access Technology (NR: New RAT).

The radio communication system 1 illustrated in FIG. 15 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells and/or in the cells.

In addition, the numerology is a communication parameter (e.g., at least one of a spacing of a subcarrier (subcarrier-spacing), a bandwidth, a symbol length, a CP time duration (CP length), a subframe length, a TTI time duration (TTI length), the number of symbols per TTI, a radio frame configuration, filtering processing and windowing processing) in a frequency direction and/or a time direction. The radio communication system 1 may support subcarrier-spacings such as 15 kHz, 30 kHz, 60 kHz, 120 kHz and 240 kHz.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two CCs or more). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be each referred to as a TDD carrier (frame configuration type 2) and an FDD carrier (frame configuration type 1).

Furthermore, each cell (carrier) may be applied a single numerology or may be applied a plurality of different numerologies.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB), a gNodeB (gNB) or a transmission/reception point (TRP). Furthermore, each radio base station 12 is a radio base station that has a local coverage, and may be referred to as a small base station, a micro base station, a pico base station, a femto base station, a Home eNodeB (HeNB), a Remote Radio Head (RRH), an eNB, a gNB or a transmission/reception point. The radio base stations 11 and 12 will be collectively referred to as a radio base station 10 below when not distinguished.

Each user terminal 20 is a terminal that supports various communication schemes such as LTE, LTE-A, 5G and NR, and may include not only a mobile communication terminal but also a fixed communication terminal. Furthermore, the user terminal 20 can perform Device-to-Device communication (D2D) with the other user terminal 20.

The radio communication system 1 can apply Orthogonal Frequency-Division Multiple Access (OFDMA) to Downlink (DL) and can apply Single Carrier-Frequency Division Multiple Access (SC-FDMA) to Uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and OFDMA may be used on UL.

Furthermore, the radio communication system 1 may use a multicarrier waveform (e.g., OFDM waveform) or may use a single carrier waveform (e.g., DFT-s-OFDM waveform).

The radio communication system 1 uses a DL shared channel (also referred to as, for example, a PDSCH: Physical Downlink Shared Channel or a downlink data channel) shared by each user terminal 20, a broadcast channel (PBCH: Physical Broadcast Channel) and an L1/L2 control channel as Downlink (DL) channels. User data, higher layer control information and System Information Blocks (SIBs) are conveyed on the PDSCH. Furthermore, Master Information Blocks (MIBs) are conveyed on the PBCH.

The L1/L2 control channel includes a downlink control channel (a Physical Downlink Control Channel (PDCCH) or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. The EPDCCH is subjected to frequency division multiplexing with the PDSCH and is used to convey DCI similar to the PDCCH. Retransmission control information (ACK/NACK) of an HARQ for the PUSCH can be conveyed on at least one of the PHICH, the PDCCH and the EPDCCH.

The radio communication system 1 uses an uplink shared channel (also referred to as, for example, a PUSCH: Physical Uplink Shared Channel or an uplink data channel) shared by each user terminal 20, an uplink control channel (PUCCH: Physical Uplink Control Channel), and a random access channel (PRACH: Physical Random Access Channel) as Uplink (UL) channels. User data and higher layer control information are conveyed on the PUSCH. Uplink Control Information (UCI) including at least one of retransmission control information (A/N) and Channel State Information (CSI) of a Downlink (DL) signal is conveyed on the PUSCH or the PUCCH. A random access preamble for establishing connection with a cell can be conveyed on the PRACH.

<Radio Base Station>

Figure 16:
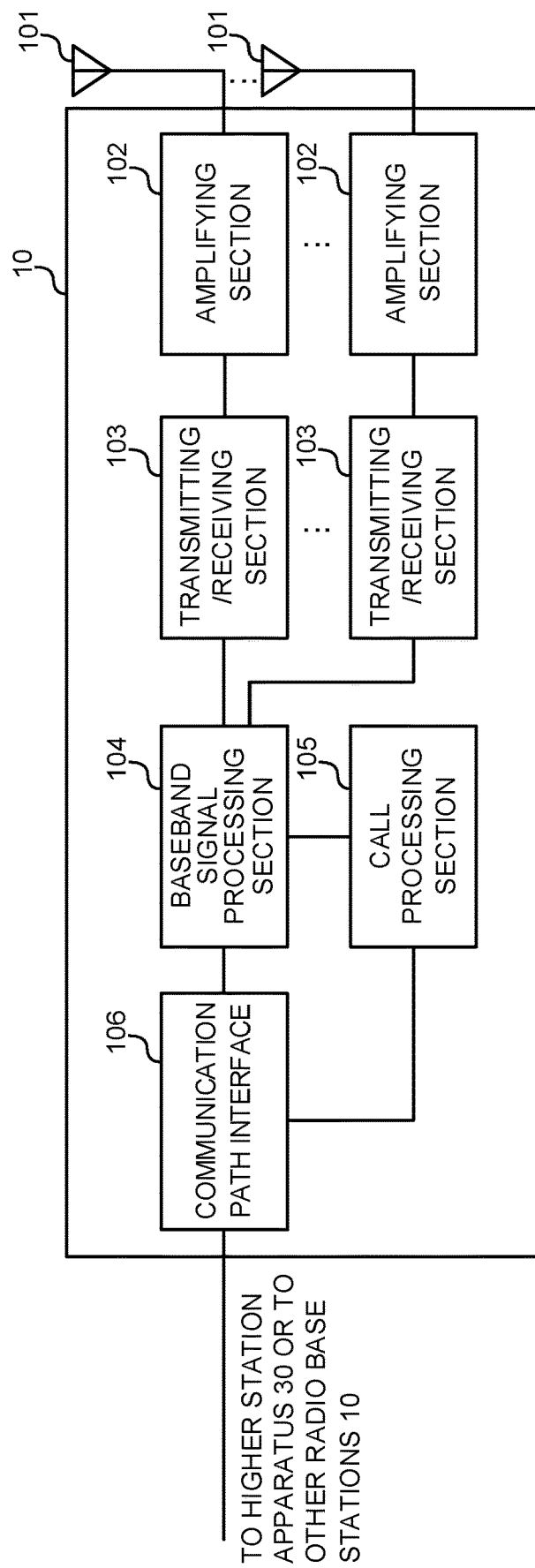
FIG. 16 is a diagram illustrating one example of an overall configuration of a radio base station according to the present embodiment.

FIG. 16 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARQ) transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency range, and transmits a radio frequency signal. The radio frequency signal subjected to frequency conversion by each transmission/reception section 103 is amplified by each amplifying section 102, and is transmitted from each transmission/reception antenna 101.

The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an Uplink (UL) signal. Each transmission/reception section 103 receives the UL signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on UL data included in the input UL signal, and transfers the UL data to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmission/reception section 103 transmits a Downlink (DL) signal (including at least one of a DL data signal, a DL control signal and a DL reference signal) to the user terminal 20, and receives an Uplink (UL) signal (including at least one of a UL data signal, a UL control signal and a UL reference signal) from the user terminal 20.

Furthermore, each transmission/reception section 103 receives an uplink data channel (e.g., PUSCH) and/or an uplink control channel (e.g., a short PUCCH and/or a long PUCCH).

Furthermore, each transmission/reception section 103 transmits control information of a higher layer signaling (higher layer control information) and Downlink Control Information (DCI) of a physical layer signaling. More specifically, each transmission/reception section 103 transmits frequency resource information (first aspect). For example, each transmission/reception section 103 transmits a plurality of parameter sets (PUCCH resource sets) each including the above frequency resource information by the higher layer signaling, and transmits downlink control information indicating one of a plurality of these parameter sets (fourth aspect). Furthermore, each transmission/reception section 103 may transmit the downlink control information including the above frequency resource information (fifth aspect).

Figure 17:
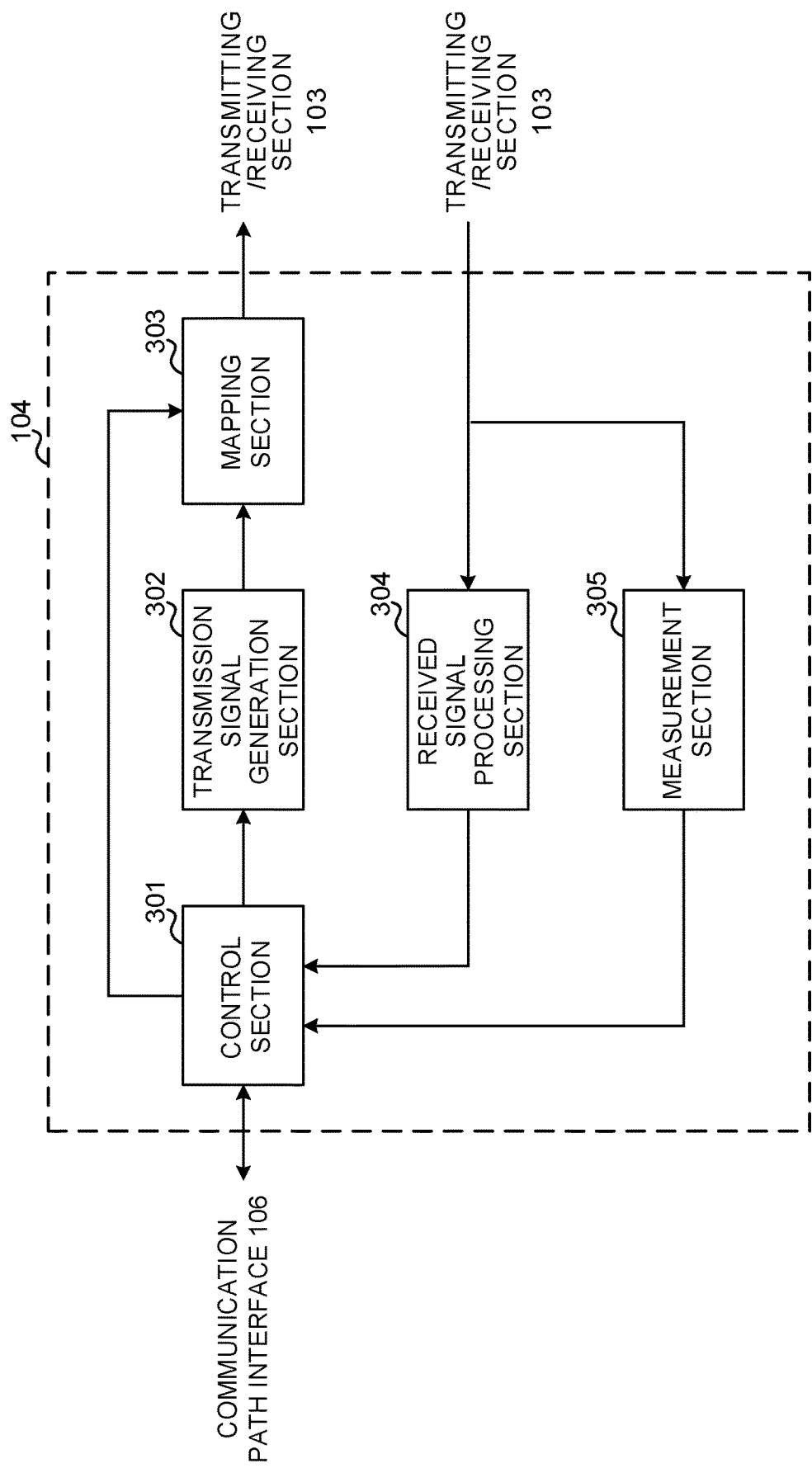
FIG. 17 is a diagram illustrating one example of a function configuration of the radio base station according to the present embodiment.

FIG. 17 is a diagram illustrating one example of a function configuration of the radio base station according to the present embodiment. In addition, FIG. 17 mainly illustrates function blocks of characteristic portions according to the present embodiment, and assumes that the radio base station 10 includes other function blocks, too, that are necessary for radio communication. As illustrated in FIG. 17, the baseband signal processing section 104 includes a control section 301, a transmission signal generating section 302, a mapping section 303, a received signal processing section 304 and a measurement section 305.

The control section 301 controls the entire radio base station 10. The control section 301 controls, for example, DL signal generation of the transmission signal generating section 302, DL signal mapping of the mapping section 303, UL signal reception processing (e.g., demodulation) of the received signal processing section 304, and measurement of the measurement section 305.

More specifically, the control section 301 schedules the user terminal 20. More specifically, the control section 301 may perform scheduling and/or retransmission control on a downlink data channel and/or an uplink data channel based on UCI (e.g., CSI and/or BI) from the user terminal 20.

Furthermore, the control section 301 may control a configuration (format) of an uplink control channel (e.g., a long PUCCH and/or a short PUCCH), and perform control to transmit the control information related to the uplink control channel.

Furthermore, the control section 301 may control intra-frequency hopping and/or inter-slot frequency hopping of the uplink control channel (e.g., the long PUCCH and/or the short PUCCH) over one or a plurality of slots. More specifically, the control section 301 may control generation and/or transmission of the above frequency resource information.

Furthermore, the control section 301 may control intra-slot frequency hopping and/or inter-slot frequency hopping of the uplink data channel (e.g., PUSCH) over one or a plurality of slots. More specifically, the control section 301 may control generation and/or transmission of the above frequency resource information.

Furthermore, the control section 301 may control generation and/or transmission of the PUCCH resource set.

The control section 301 may control the received signal processing section 304 to perform reception processing on the UCI from the user terminal 20 based on the format of the uplink control channel.

The control section 301 can be composed of a controller, a control circuit or a control apparatus described based on the common knowledge in the technical field according to the present invention.

The transmission signal generating section 302 generates a DL signal (including a DL data signal, a DL control signal and a DL reference signal) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on given radio resources based on the instruction from the control section 301, and outputs the DL signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal and a UL reference signal) transmitted from the user terminal 20. More specifically, the received signal processing section 304 outputs the received signal or the signal after the reception processing to the measurement section 305. Furthermore, the received signal processing section 304 performs UCI reception processing based on the uplink control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of a UL reference signal. The measurement section 305 may output a measurement result to the control section 301.

<User Terminal>

Figure 18:
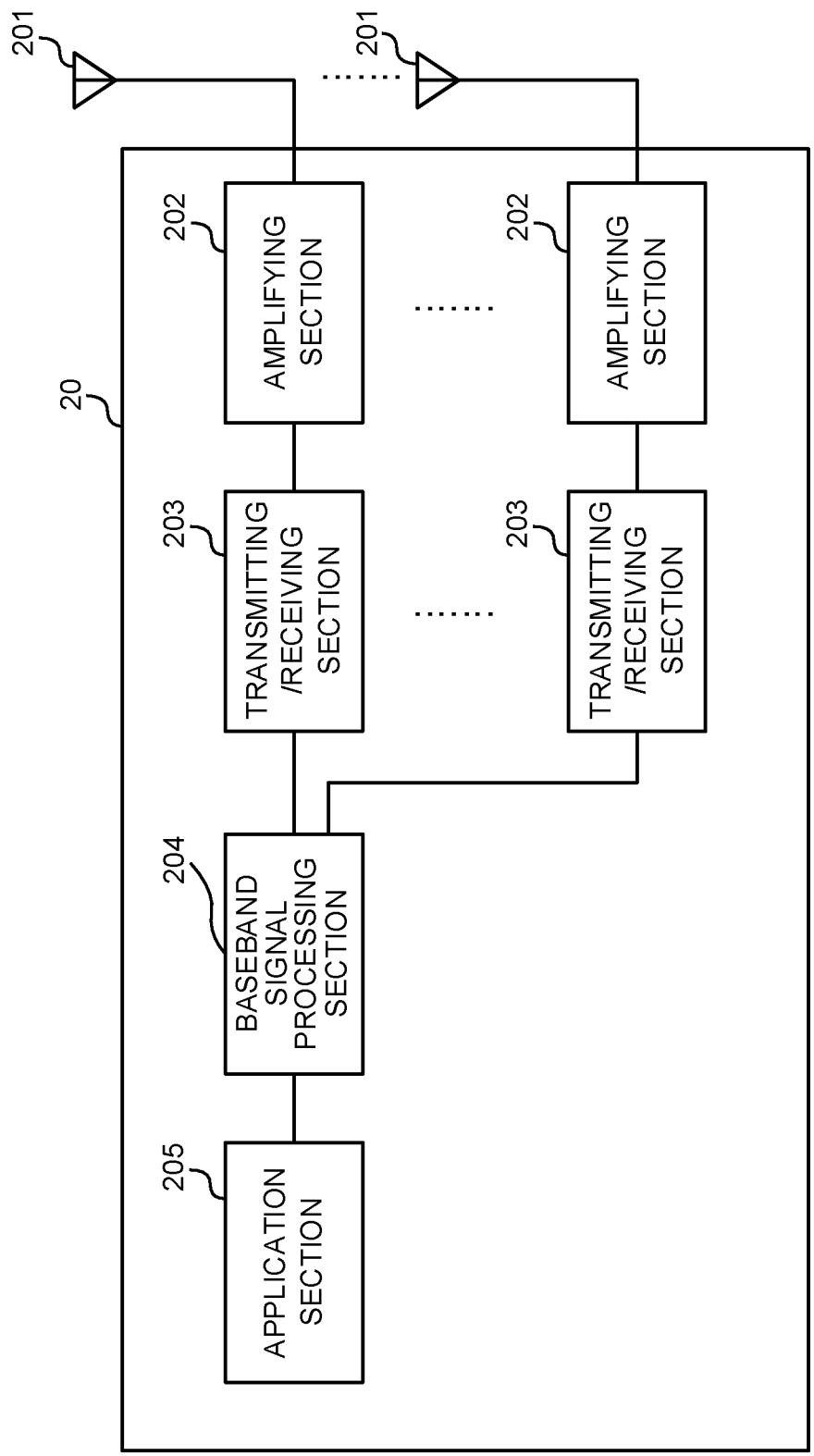
FIG. 18 is a diagram illustrating one example of an overall configuration of a user terminal according to the present embodiment.

FIG. 18 is a diagram illustrating one example of an overall configuration of the user terminal according to the present embodiment. The user terminal 20 includes pluralities of transmission/reception antennas 201 for MIMO transmission, amplifying sections 202 and transmission/reception sections 203, a baseband signal processing section 204 and an application section 205.

The respective amplifying sections 202 amplify radio frequency signals received at a plurality of transmission/reception antenna 201. Each transmission/reception section 203 receives a DL signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, and retransmission control reception processing on the input baseband signal. The baseband signal processing section 204 transfers DL data to the application section 205. The application section 205 performs processing related to layers higher than a physical layer and an MAC layer. Furthermore, the baseband signal processing section 204 may transfer broadcast information, too, to the application section 205.

On the other hand, the application section 205 inputs Uplink (UL) data to the baseband signal processing section 204. The baseband signal processing section 204 performs retransmission control transmission processing (e.g., HARQ transmission processing), channel coding, rate matching, puncturing, Discrete Fourier Transform (DFT) processing and IFFT processing on the uplink data, and transfers the uplink data to each transmission/reception section 203. The baseband signal processing section 204 performs at least one of channel coding, rate matching, puncturing, DFT processing and IFFT processing on UCI, too, and transfers the UCI to each transmission/reception section 203.

Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 receives a Downlink (DL) signal (including the DL data signal, the DL control signal or the DL reference signal) of numerologies configured to the user terminal 20, and transmits a UL signal (including the UL data signal, the UL control signal or the UL reference signal) of the numerologies.

Furthermore, each transmission/reception section 203 transmits the uplink data channel (e.g., PUSCH) and/or the uplink control channel (e.g., the short PUCCH and/or the long PUCCH).

Furthermore, each transmission/reception section 203 receives the control information of the higher layer signaling (higher layer control information) and the Downlink Control Information (DCI) of the physical layer signaling. More specifically, each transmission/reception section 203 receives the frequency resource information (first aspect). Furthermore, each transmission/reception section 203 may receive a plurality of parameter sets (PUCCH resource sets) each including the above frequency resource information by the higher layer signaling, and receive the downlink control information indicating one of a plurality of these parameter sets (fourth aspect). Furthermore, each transmission/reception section 203 may receive the downlink control information including the above frequency resource information (fifth aspect).

The transmission/reception sections 203 can be composed as transmitters/receivers, transmission/reception circuits or transmission/reception apparatuses described based on the common knowledge in the technical field according to the present invention. Furthermore, the transmission/reception sections 203 may be composed as an integrated transmission/reception section or may be composed of transmission sections and reception sections.

Figure 19:
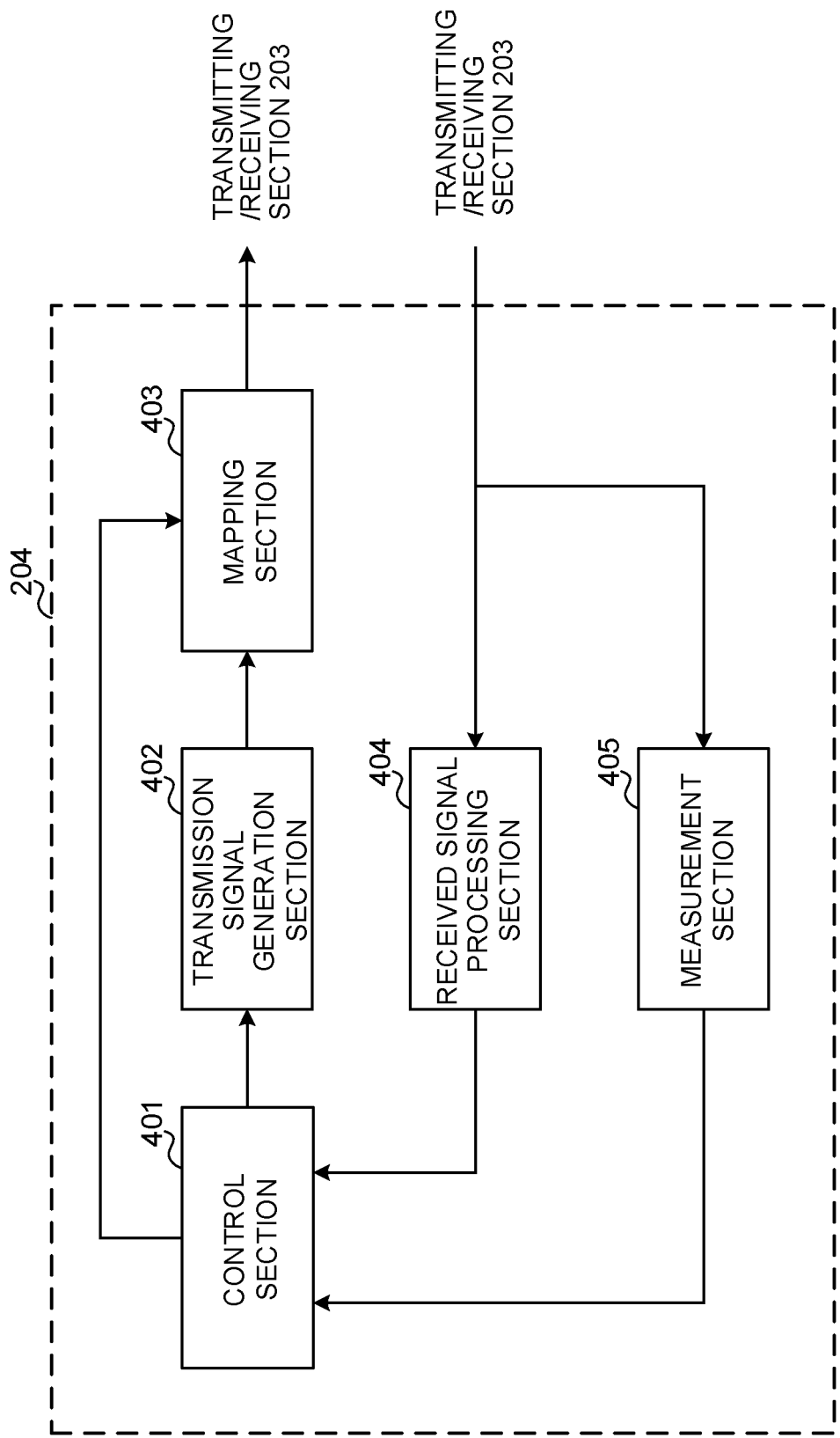
FIG. 19 is a diagram illustrating one example of a function configuration of the user terminal according to the present embodiment.

FIG. 19 is a diagram illustrating one example of a function configuration of the user terminal according to the present embodiment. In addition, FIG. 19 mainly illustrates function blocks of characteristic portions according to the present embodiment, and assumes that the user terminal 20 includes other function blocks, too, that are necessary for radio communication. As illustrated in FIG. 19, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls, for example, UL signal generation of the transmission signal generating section 402, UL signal mapping of the mapping section 403, DL signal reception processing of the received signal processing section 404, and measurement of the measurement section 405.

Furthermore, the control section 401 may control the uplink control channel used for transmission of the UCI from the user terminal 20, based on an explicit instruction from the radio base station 10 or implicit determination of the user terminal 20.

Furthermore, the control section 401 may control the configuration (format) of the uplink control channel (e.g., the long PUCCH and/or the short PUCCH). The control section 401 may control the format of the uplink control channel based on the control information from the radio base station 10.

Furthermore, the control section 401 may control transmission of the uplink control channel (e.g., the long PUCCH and/or the short PUCCH) over one or a plurality of slots. More specifically, the control section 401 may control frequency hopping of the uplink control channel in each slot based on information (intra-slot FH information) related to frequency resources on which the uplink control channel is mapped.

Furthermore, the control section 401 may control frequency hopping of the uplink control channel between a plurality of slots.

More specifically, based on the information (frequency resource information) related to the frequency resources on which the uplink control channel is mapped, the control section 401 may control frequency hopping (inter-slot frequency hopping) of the uplink control channel between a plurality of slots (first aspect).

Furthermore, when receiving a plurality of parameter sets each including the frequency resource information by a higher layer signaling, the control section 401 may control frequency hopping of the uplink control channel between a plurality of slots based on one of a plurality of these parameter sets indicated by the downlink control information (fourth aspect).

Furthermore, based on information (intra-slot FH information) related to frequency resources used in a case where frequency hopping in a slot (intra-slot frequency hopping) is enabled, the control section 401 may control frequency hopping (inter-slot frequency hopping) of the uplink control channel between a plurality of slots (second aspect).

In this regard, the above information (the above frequency resource information and/or intra-slot FH information) related to the frequency resources may include information indicating one of a frequency offset from a frequency resource of a previous hop, a frequency offset from a frequency resource configured by a higher layer signaling, and a frequency offset from an edge of a frequency band configured to the user terminal.

When the uplink control channel is transmitted over a plurality of slots, the control section 401 may control inter-slot frequency hopping of the uplink control channel based on information indicating which one of frequency hopping in each slot (intra-slot frequency hopping) and frequency hopping between a plurality of slots (inter-slot frequency hopping) is enabled.

Furthermore, the control section 401 may control transmission of the uplink data channel (e.g., PUSCH) over one or a plurality of slots. More specifically, the control section 401 may control frequency hopping of the uplink data channel in each slot based on the information (intra-slot FH information) related to the frequency resources on which the uplink data channel is mapped.

Furthermore, the control section 401 may control frequency hopping of the uplink data channel between a plurality of slots.

More specifically, based on the information (frequency resource information) related to the frequency resources on which the uplink data channel is mapped, the control section 401 may control frequency hopping (inter-slot frequency hopping) of the uplink data channel between a plurality of slots (first aspect).

Furthermore, when the downlink control information including the above information related to the above frequency resources is received. the control section 401 may control frequency hopping (inter-slot frequency hopping) of the uplink data channel between a plurality of slots based on the downlink control information (fifth aspect).

Furthermore, based on the information (intra-slot FH information) related to the frequency resources used in a case where frequency hopping in a slot (intra-slot frequency hopping) is enabled, the control section 401 may control frequency hopping (inter-slot frequency hopping) of the uplink control channel between a plurality of slots (second aspect).

In this regard, the above information (the above frequency resource information and/or intra-slot FH information) related to the frequency resources may include information indicating one of a frequency offset from a frequency resource of a previous hop, a frequency offset from a frequency resource configured by a higher layer signaling, and a frequency offset from an edge of a frequency band configured to the user terminal.

When the uplink data channel is transmitted over a plurality of slots, the control section 401 may control inter-slot frequency hopping of the uplink data channel based on the information indicating which one of frequency hopping in each slot (intra-slot frequency hopping) and frequency hopping between a plurality of slots (inter-slot frequency hopping) is enabled.

Furthermore, the control section 401 may determine PUCCH resources used for a PUCCH format based on a higher layer signaling and/or downlink control information.

The control section 401 may control at least one of the transmission signal generating section 402, the mapping section 403 and each transmission/reception section 203 to perform UCI transmission processing based on the PUCCH format.

The control section 401 can be composed of a controller, a control circuit or a control apparatus described based on the common knowledge in the technical field according to the present invention.

The transmission signal generating section 402 generates (e.g., encodes, rate-matches, punctures or modulates) a UL signal (including a UL data signal, a UL control signal, a UL reference signal and UCI) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on radio resources based on the instruction from the control section 401, and outputs the UL signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal or a DL reference signal). The received signal processing section 404 outputs to the control section 401 information received from the radio base station 10. The received signal processing section 404 outputs, for example, broadcast information, system information, higher layer control information of a higher layer signaling such as an RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 20:
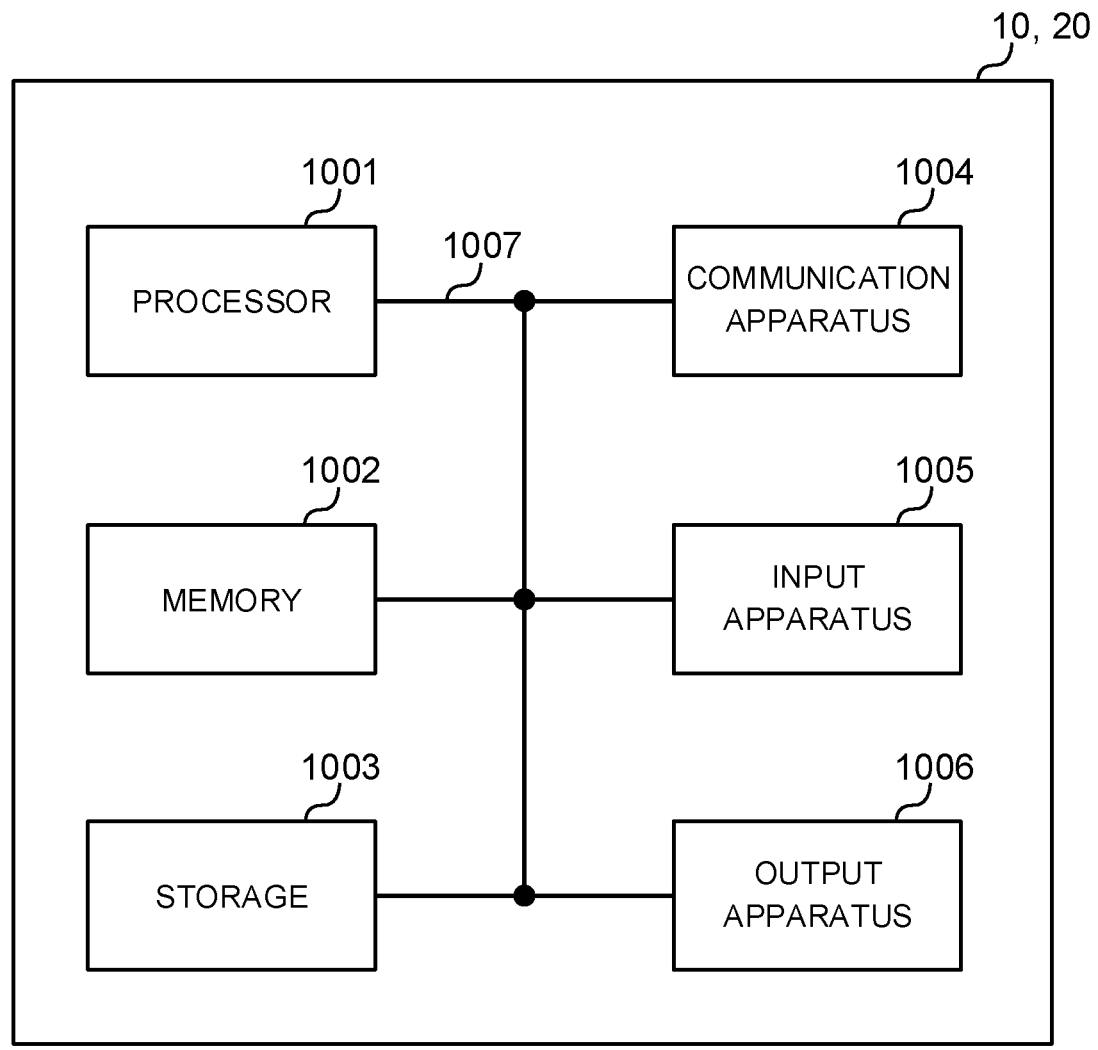
FIG. 20 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 20 is a diagram illustrating one example of the hardware configurations of the radio base station and the user terminal according to the present embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 20 or may be configured without including part of the apparatuses.

For example, FIG. 20 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol.

For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus or a reception apparatus.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMES) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on"

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
    a transmitter that transmits a physical uplink shared channel (PUSCH) over a plurality of slots; and
    a processor that controls inter-slot frequency hopping applied to the PUSCH transmission over the plurality of slots based on information related to a frequency resource that is same as when intra-slot frequency hopping is applied.

2. The terminal according to claim 1, wherein the information related to the frequency resource is information indicating a frequency resource where the inter-slot frequency hopping over the plurality of slots starts and a frequency offset to a frequency resource before hopping.

3. The terminal according to claim 2, further comprising:
    a receiver that receives downlink control information including the information indicating the frequency resource where the inter-slot frequency hopping starts and downlink control information including information indicating the frequency offset.

4. The terminal according to claim 3, wherein
    the receiver receives application information regarding whether the intra-slot frequency hopping or the inter-slot frequency hopping over the plurality of slots is applied, and
    the processor controls the frequency hopping over the plurality of slots of the PUSCH based on the application information.

5. A radio communication method for a terminal, comprising:
    transmitting a physical uplink shared channel (PUSCH) over a plurality of slots; and
    controlling frequency inter-slot hopping applied to the PUSCH transmission over the plurality of slots based on information related to a frequency resource that is same as when intra-slot frequency hopping is applied.

6. A radio communication system comprising a terminal and a base station, wherein:
    the terminal comprises:
        a transmitter that transmits a physical uplink shared channel (PUSCH) over a plurality of slots; and
        a processor that controls inter-slot frequency hopping applied to the PUSCH transmission over the plurality of slots based on information related to a frequency resource that is same as when intra-slot frequency hopping is applied, and
    the base station comprises:
        a receiver that receives the PUSCH.

* * * * *